C. & W. WENDE.
BOTTLE CLEANING MACHINE.
APPLICATION FILED SEPT. 23, 1909.

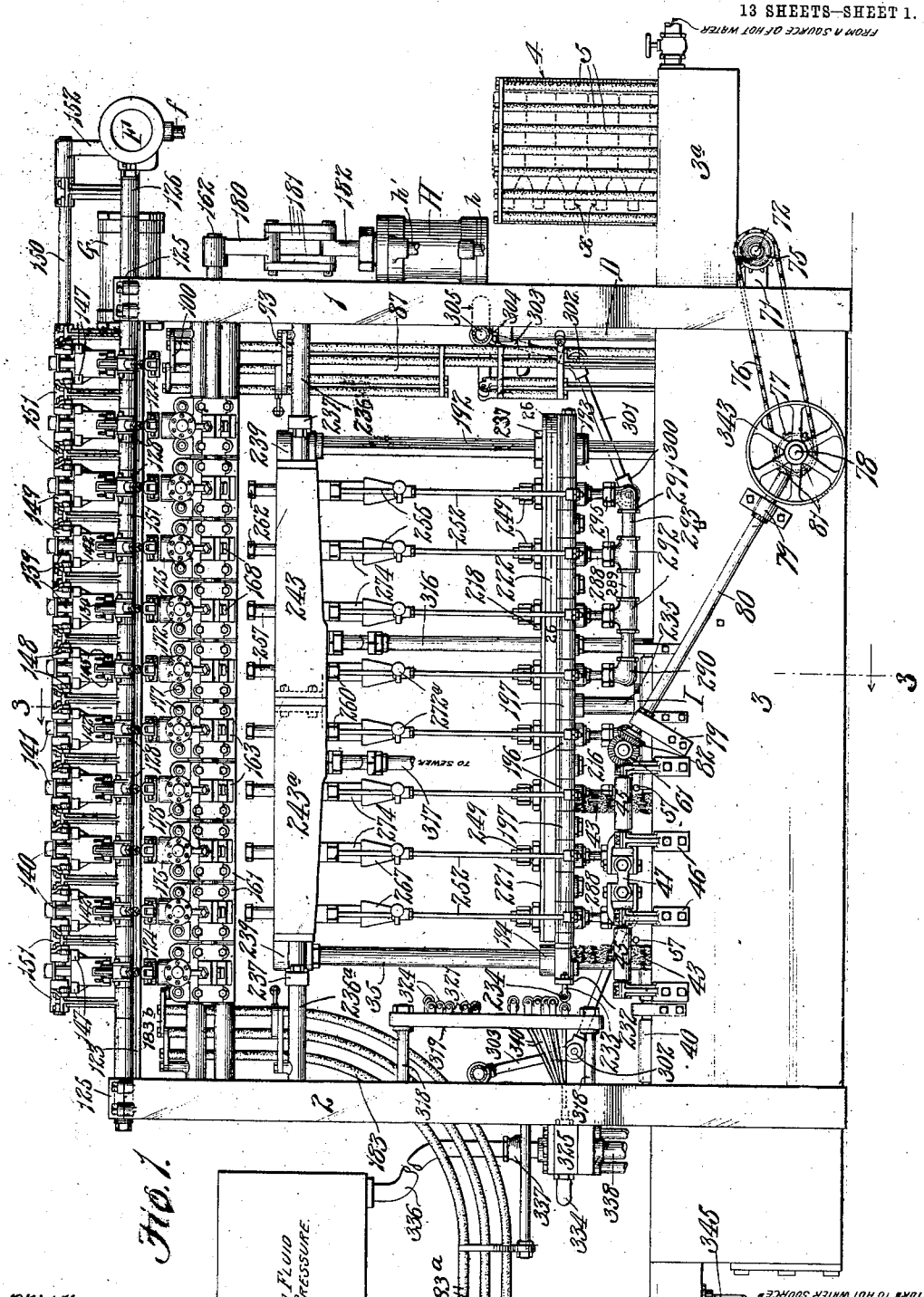

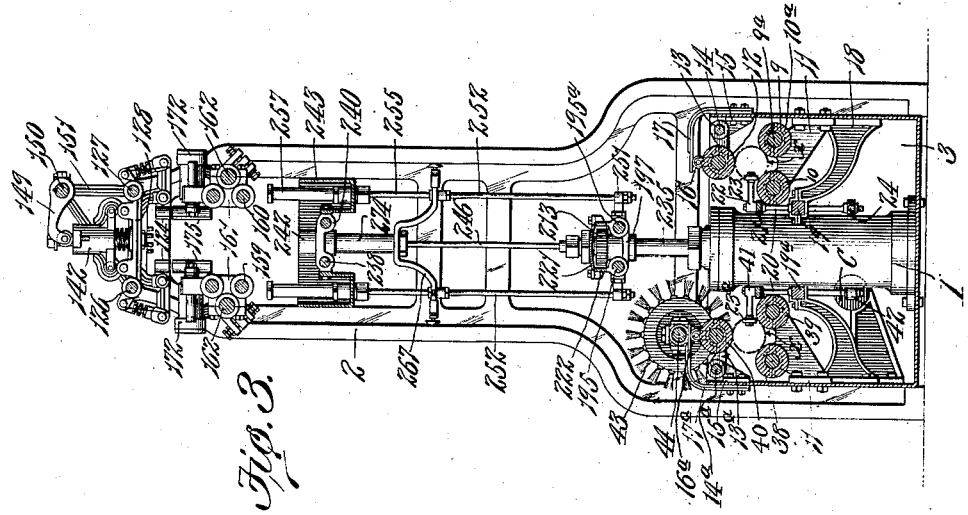
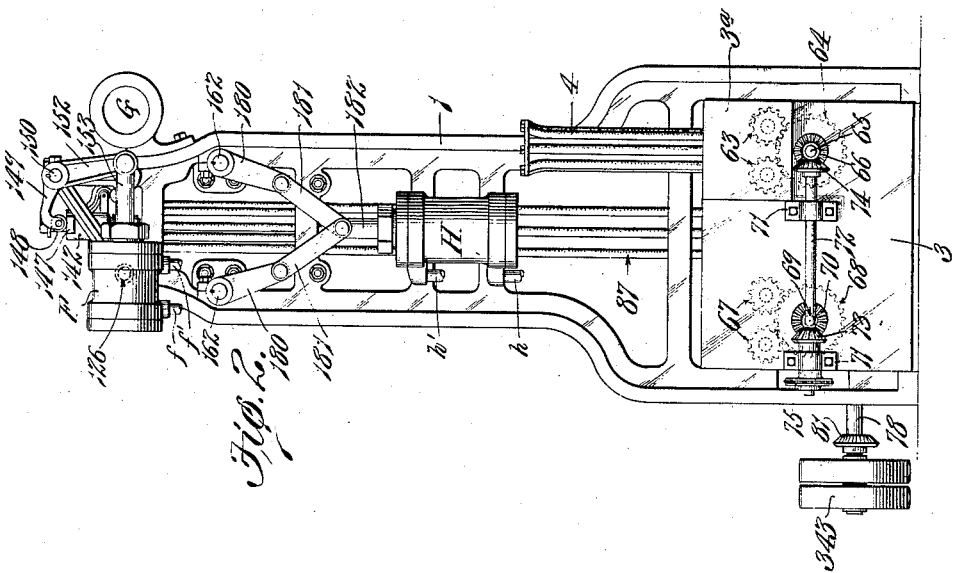

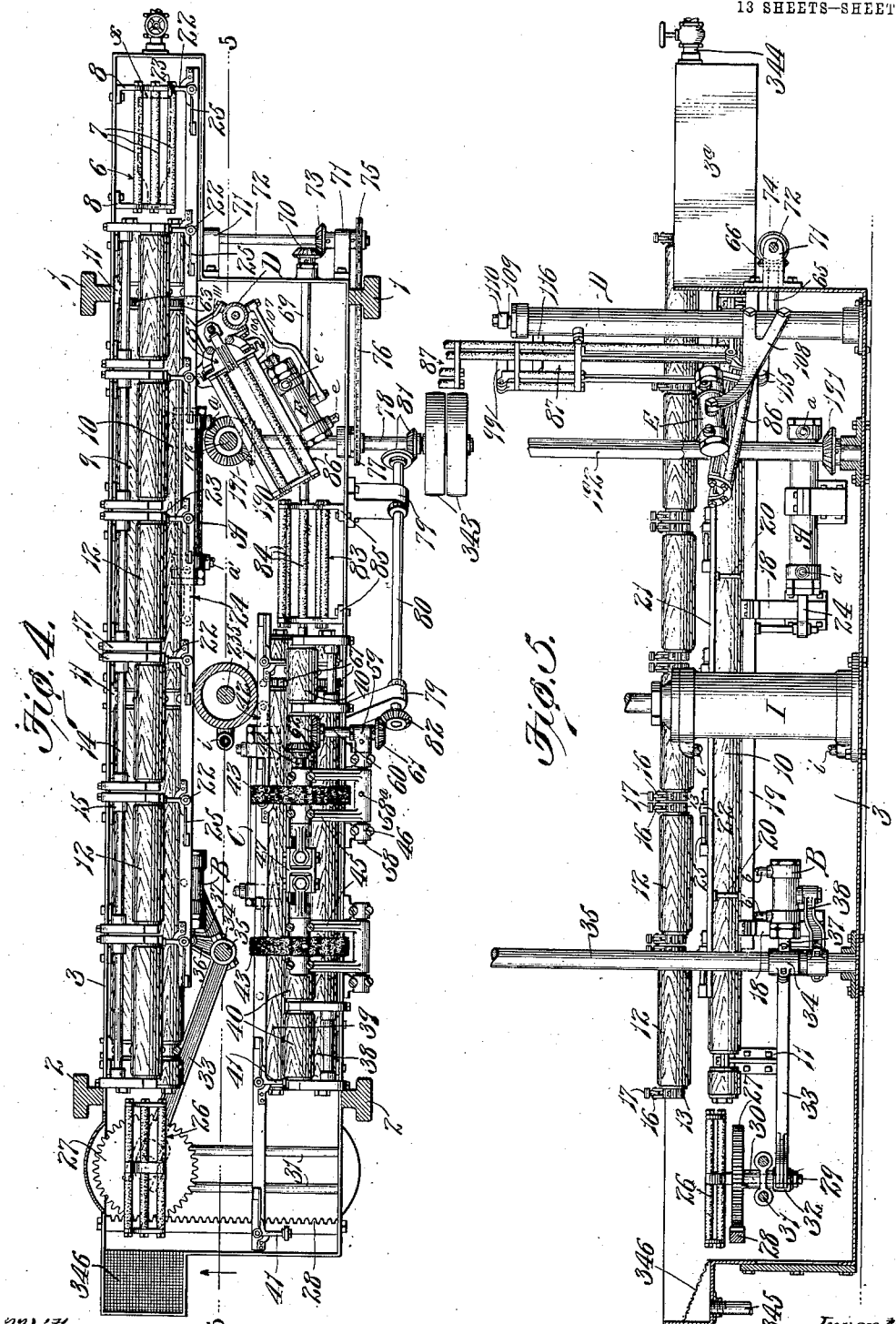

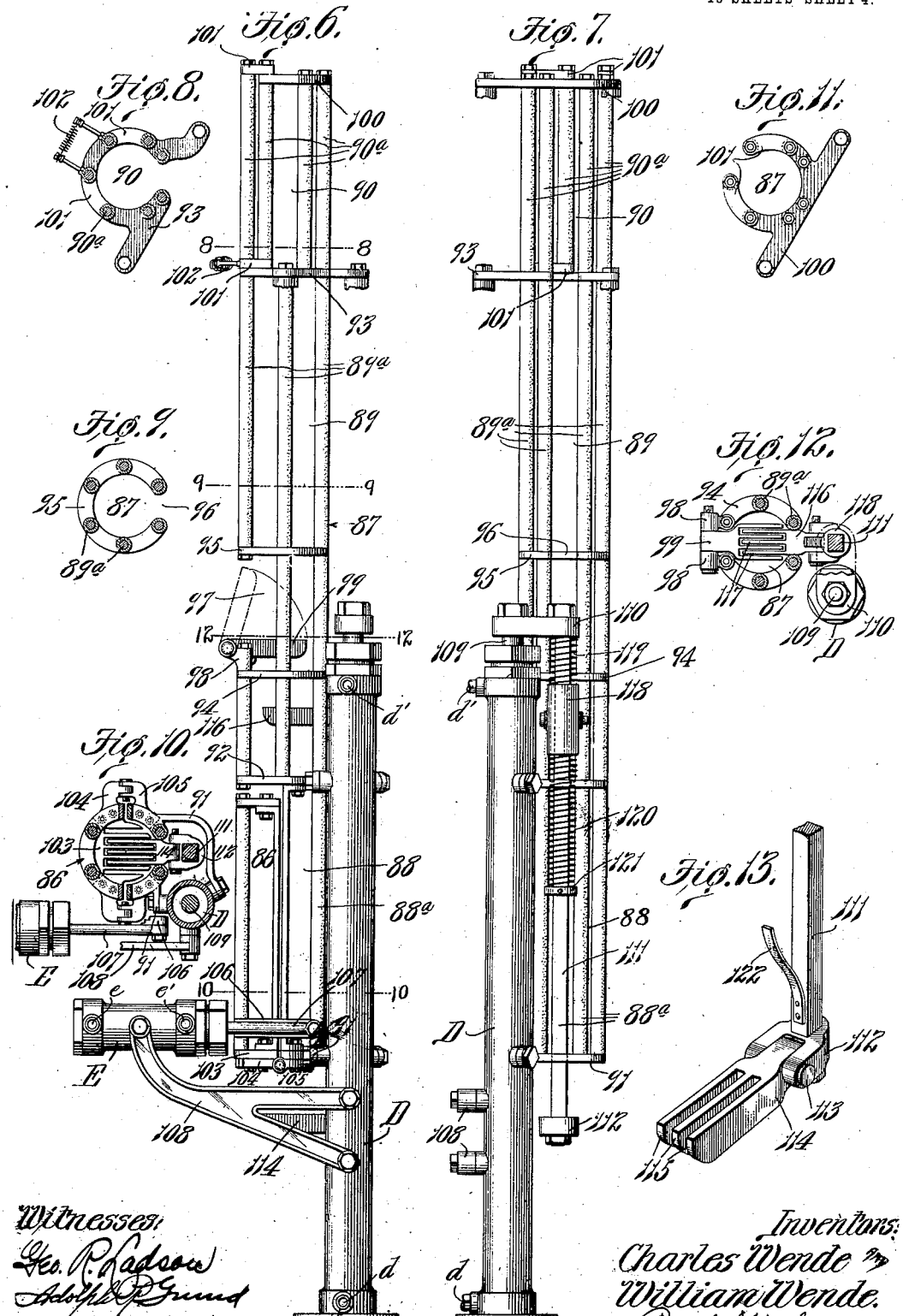

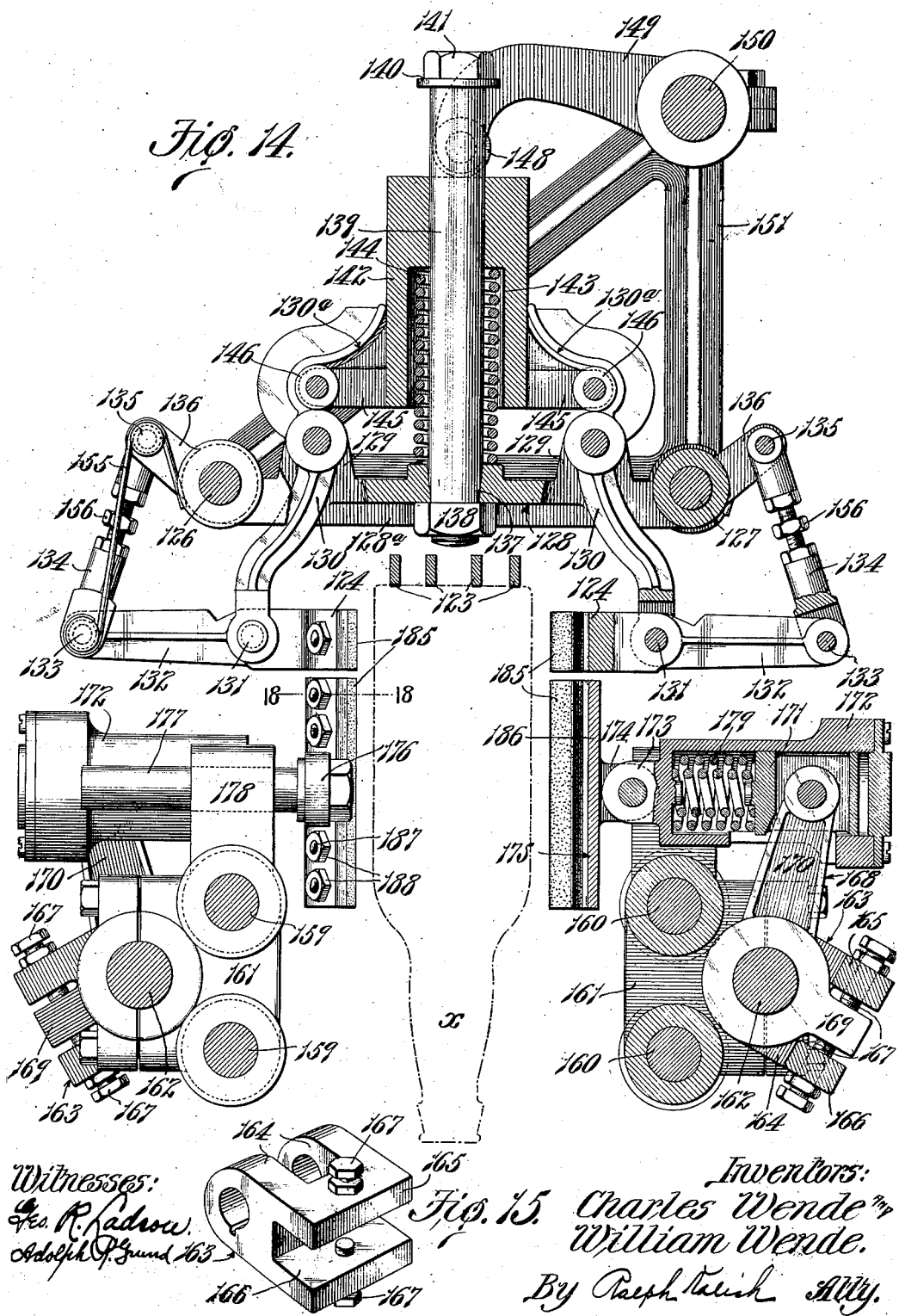

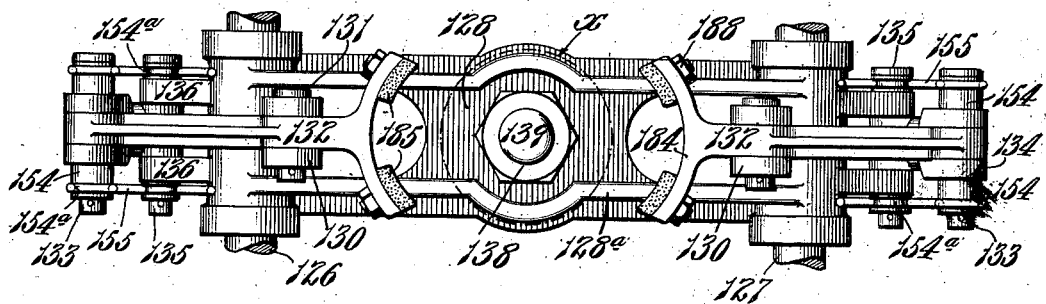
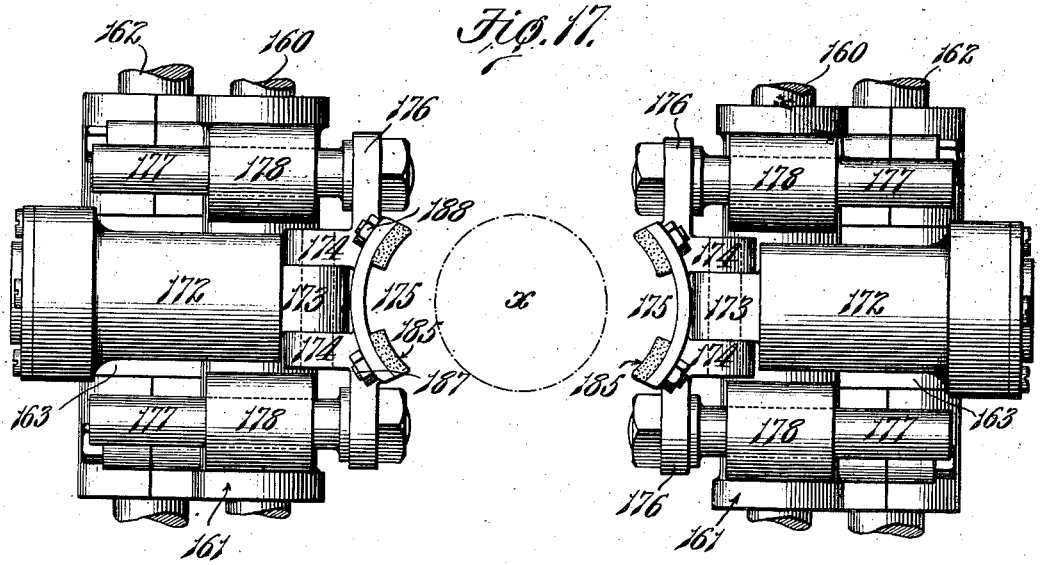

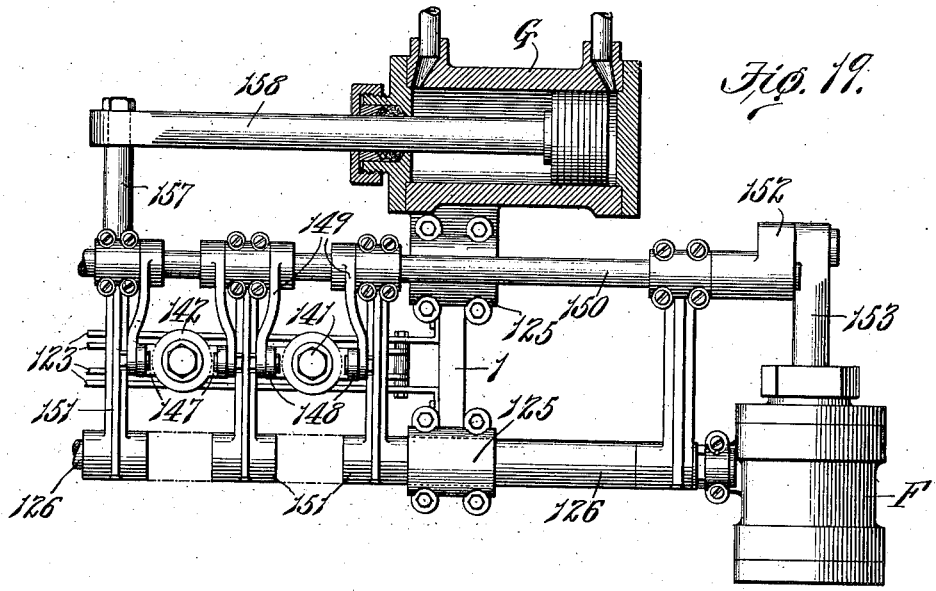
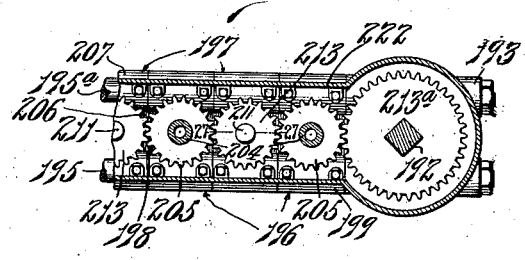
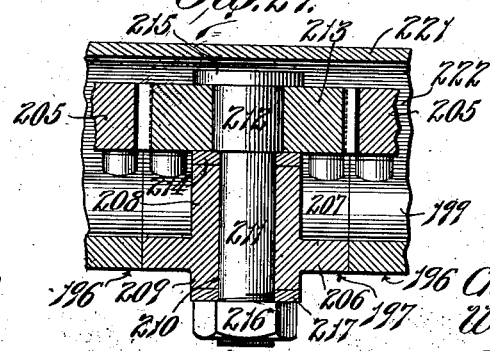

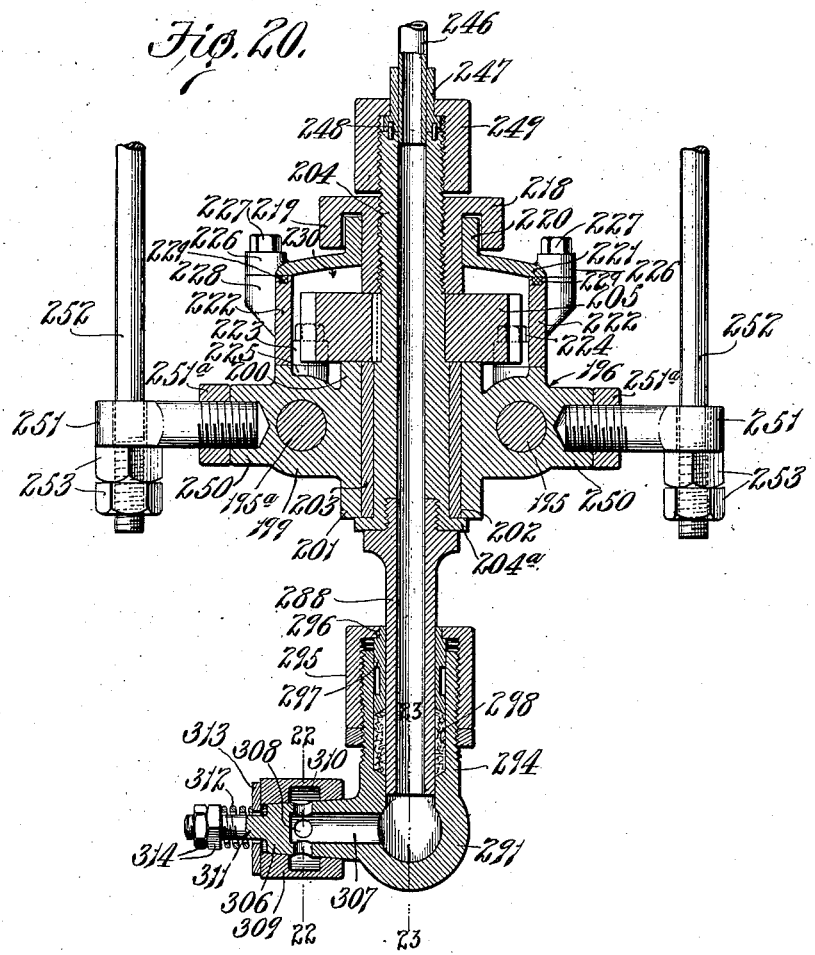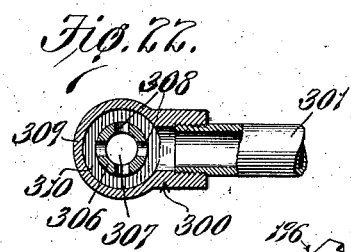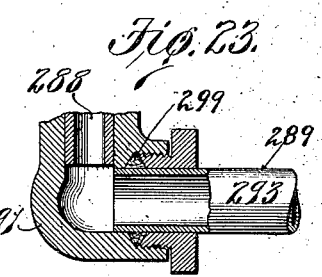

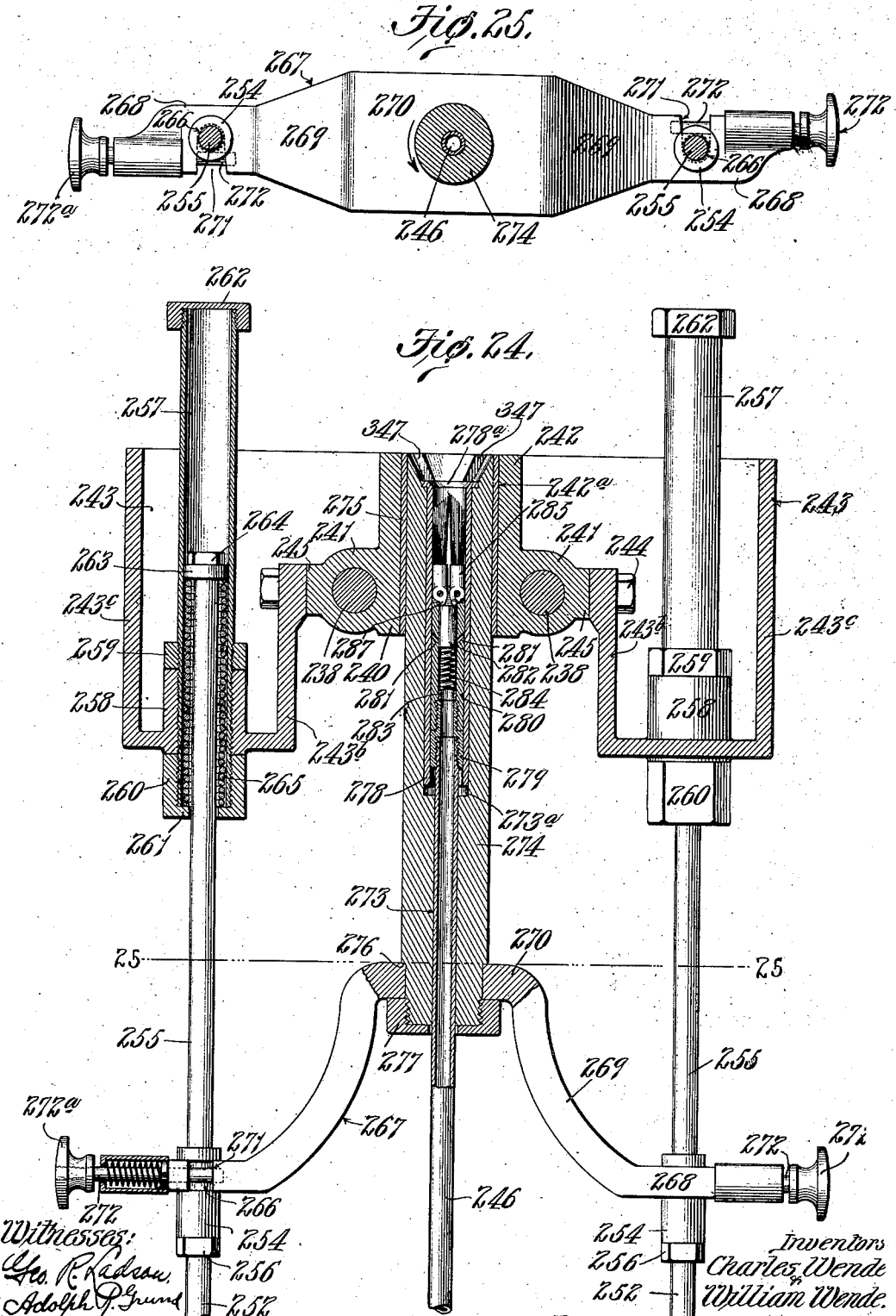

1,074,674.

Patented Oct. 7, 1913.
13 SHEETS—SHEET 10.

Witnesses:
Geo. R. Ladson
Adolph P. Grund

Inventors,
Charles Wende
William Wende.
By Ralph Kalish Atty.

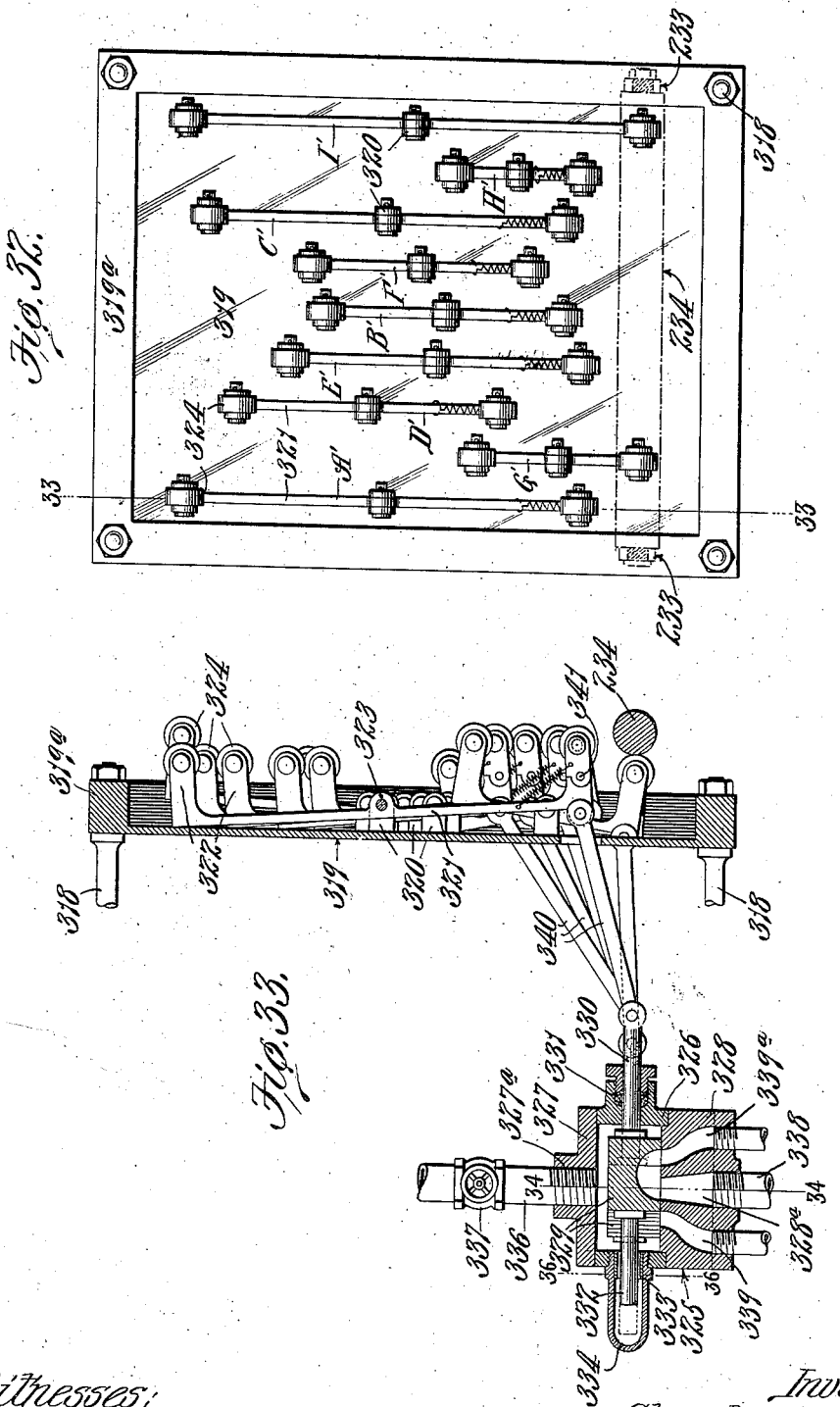

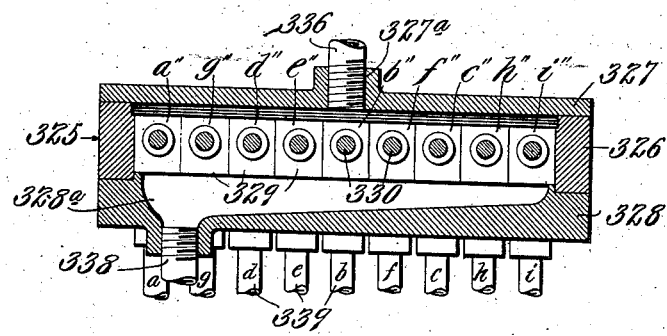
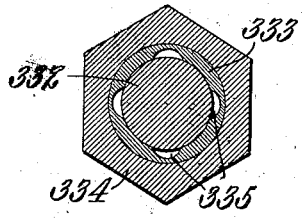
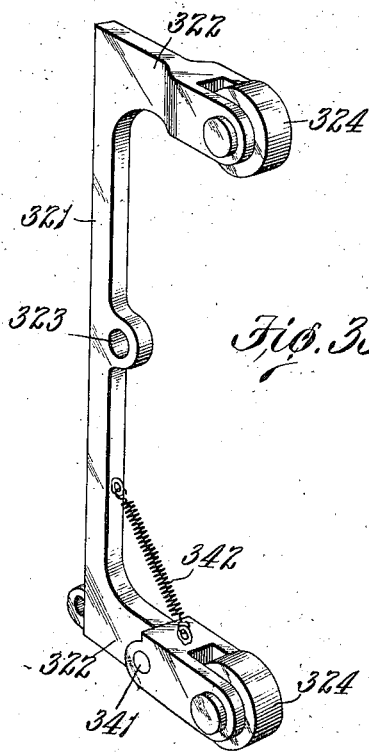

C. & W. WENDE.
BOTTLE CLEANING MACHINE.
APPLICATION FILED SEPT. 23, 1909.
1,074,674.
Patented Oct. 7, 1913.
13 SHEETS—SHEET 13.
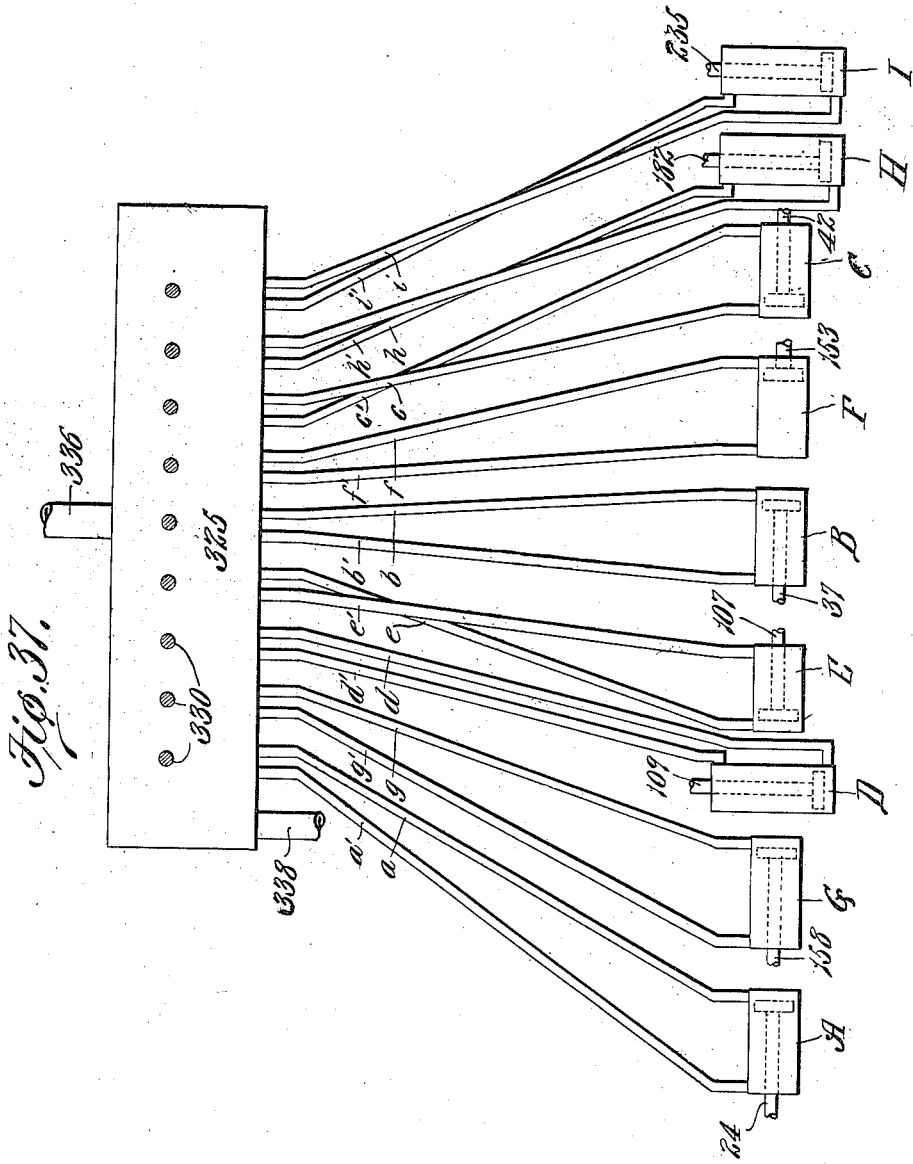
Witnesses:
Geo. R. Ladson.
Adolph P. Grund.
Inventors:
Charles Wende
William Wende.
By Ralph Teich Atty.

UNITED STATES PATENT OFFICE.

CHARLES WENDE AND WILLIAM WENDE, OF ST. LOUIS, MISSOURI, ASSIGNORS TO CHASWILL MANUFACTURING COMPANY, OF ST. LOUIS, MISSOURI, A CORPORATION OF MISSOURI.

BOTTLE-CLEANING MACHINE.

1,074,674. Specification of Letters Patent. Patented Oct. 7, 1913.

Application filed September 23, 1909. Serial No. 519,117.

*To all whom it may concern:*

Be it known that we, CHARLES WENDE and WILLIAM WENDE, citizens of the United States, residing at the city of St. Louis, State of Missouri, have jointly invented a new and useful Bottle-Cleaning Machine, of which the following is a specification, reference being had to the accompanying drawings, forming a part hereof, in which—

Figure 28:
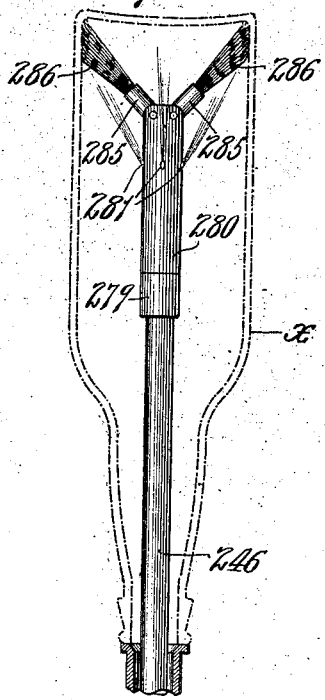
Figure 29:
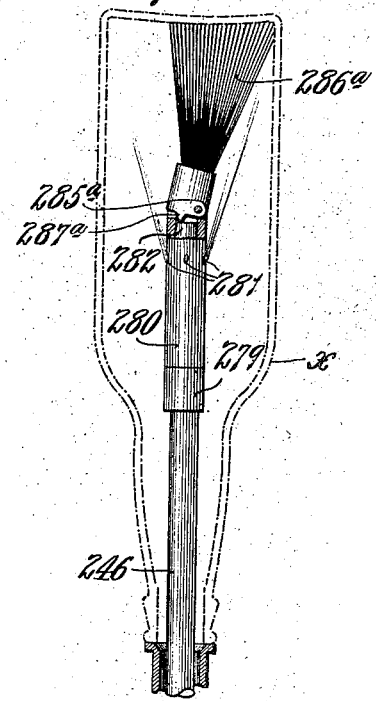
Figure 30:
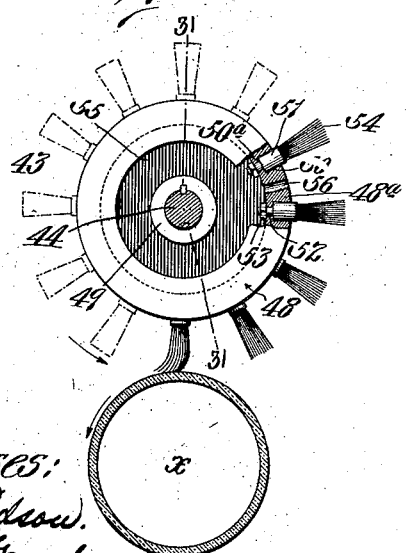
Figure 31:
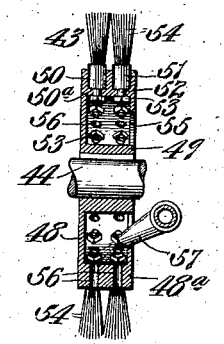

Figure 1 is a side elevational view of our machine; Fig. 2 is a front elevational view thereof; Fig. 3 is a vertical-sectional view on the line 3—3 Fig. 1; Fig. 4 is a plan view of the bottle-soaking tank and its associate parts; Fig. 5 is a longitudinal sectional view on the line 5—5, Fig. 4; Fig. 6 is a side elevational view of the elevator-shaft and its associate parts; Fig. 7 is a front elevational view of the same; Fig. 8 is a cross-sectional view on the line 8—8, Fig. 6; Fig. 9 is a cross-sectional view on the line 9—9, Fig. 6; Fig. 10 is a cross-sectional view on the line 10—10, Fig. 6; Fig. 11 is a plan view of the top of the elevator-shaft; Fig. 12 is a cross-sectional view on the line 12—12, Fig. 6; Fig. 13 is a detail view, slightly enlarged, of the lower bottle-elevating plate; Fig. 14 is an enlarged detail view, partly in section, showing a pair of upper gripping jaws and a pair of lower holding jaws and their operating mechanism; Fig. 15 is a detail view of the casting for regulating or adjusting the amount of movement or throw of the lower holding jaws; Fig. 16 is an enlarged bottom plan view of a pair of upper gripping or carrying jaws and their associate parts; Fig. 17 is an enlarged top plan view of a pair of lower clamping or holding jaws and their associate parts; Fig. 18 is a fragmentary detail sectional view on the line 18—18, Fig. 14; Fig. 19 is an enlarged plan view, partly in section, of the mechanism for operating the upper gripping or carrying jaws; Fig. 20 is an enlarged detail sectional view, showing one of the vertically-movable gear-carrying castings and its associate parts; Fig. 21 is a detail perspective view of one of the vertically-movable gear-carrying castings; Fig. 22 is a vertically-sectional view on the line 22—22, Fig. 20; Fig. 23 is a vertical-sectional view on the line 23—23, Fig. 20; Fig. 24 is an enlarged detail sectional view of one of the vertically-movable brushes and its associate parts; Fig. 25 is a cross-sectional view on the line 25—25, Fig. 24; Fig. 26 is a detail cross-sectional view on the line 26—26, Fig. 1; Fig. 27 is a vertical-sectional view on the line 27—27, Fig. 26; Fig. 28 is a detail view, showing the same in operative position, of one of the pairs of brushes used in our machine to clean the interior side surface of the bottle; Fig. 29 is a similar view of one of the brushes used in our machine to clean the interior bottom surface of the bottle; Fig. 30 is a detail view, partly in section, of one of the rotary brushes used in our machine to clean the exterior surface of the bottle, showing the same in operative position; Fig. 31 is a sectional view on the line 31—31, Fig. 30; Fig. 32 is an elevational plan view of the valve-operating levers and their supporting-diaphragm; Fig. 33 is a vertical sectional view, approximately on the line 33—33, Fig. 32; Fig. 34 is a vertical sectional view on the line 34—34, Fig. 33; Fig. 35 is an enlarged detail perspective view of one of the valve-operating levers; Fig. 36 is an enlarged detail sectional view on the line 36—36, Fig. 33; and Fig. 37 is a diagrammatic view, illustrating the valve-chest, the several cylinders in our machine, and the connecting-pipes between said chest and cylinders.

This invention relates to certain new and useful improvements in bottle-cleaning machines.

Heretofore great difficulty has been experienced in quickly and thoroughly cleaning not only the exterior, but also the interior, and particularly the bottom and corners of the interior, as they might be called, of beer bottles and the like.

The object of our invention is, therefore, broadly to provide a machine which is automatic in its operation and in and by which the bottles are thoroughly and fully cleaned, both exteriorly and interiorly, in a short space of time.

With this object in view, our invention resides broadly in the novel features of construction of the various parts of our machine and in the novel arrangement and combination of the various parts thereof, all as will hereinafter be described and afterward pointed out in the claims.

Briefly, in our machine the bottles, with their heads facing rearwardly are successively placed upon a stationary basket mounted in a tank of preferably hot water, through which tank the bottles are successively shifted from said basket between a set of horizontally-disposed revolving rollers and then on to a turn-table at the rearward end of the tank. This turn-table is then automatically operated to successively present the bottles, with their heads now facing forwardly, to a second set of horizontally-disposed revolving rollers, between which rollers the bottles are now successively shifted and moved step-by-step until they are shifted or projected into a second stationary basket. During all this travel the bottles are being rotated in said hot water by said rollers, and while being shifted or passed between said second set of rollers, the bottles are also exteriorly subjected to the action of revolving brushes, whereby not only are the bottles, both exteriorly and interiorly, thoroughly soaked or washed in said hot water, but also the outer surface of each thereof is thoroughly cleaned, all labels, rust, or other foreign matter on the exterior thereof being fully removed. From said second stationary basket, the bottles are now successively shifted into a pivoted basket, which is adapted to successively raise the bottles from a substantially horizontal position to a vertical position with their heads down. The bottles are then successively and gradually elevated from said tank to the top of the machine, where they are successively grasped are carried by a series of pairs of reciprocating carrying-jaws through a series of pairs of stationary holding jaws to a discharge-chute, each of said pairs of holding-jaws being adapted to hold a bottle a short space of time. While the bottles are being so held in said holding-jaws, vertically-acting revolving brushes are automatically thrust upwardly into the interior of each bottle, the interior of each being at the same time sprayed with water, whereby the entire interior surface of each bottle is thoroughly cleaned. The said series of pairs of lower holding-jaws are preferably divided into two sets, the water sprayed into the bottles while being held in the first set of said holding-jaws being preferably warm or hot, while the water sprayed into the said bottles while being held in said second set of holding-jaws is preferably cold, so that the interior of each bottle will not only be thoroughly cleaned, but also thoroughly rinsed before the bottles are delivered into said discharge-chute. As will be later seen, the several parts of our machine are arranged to automatically operate at the proper time, so that the bottles are successively, and as might be said, step by step carried or fed through the machine and, during such passage or travel, are thoroughly and fully soaked, cleaned, and rinsed in a very short space of time.

In the drawings, 1 and 2 indicate suitable end-frames, see particularly Figs. 1, 2, and 3, adapted to support the various parts of our machine and which are suitably tied together as hereinafter appearing. Mounted at the base and preferably extending between said end-frames is a preferably sheet-metal rectangular tank 3 adapted to contain preferably hot water, said tank being provided with an outwardly-extending, preferably integral portion $3^a$. Merely for convenience in herein describing our machine, we will call the right-hand side of our machine as shown in Fig. 1 the front and the left-hand side the rear of our machine. Located above and leading into said portion $3^a$ at the front of tank 3 is a chute 4 open at its top and composed preferably of fiber-covered rods 5, the bottles $x$ being adapted to be successively and continuously passed through said chute flatwise or in a horizontal position with their heads facing rearwardly or presented toward end-frame 1 on to a horizontally-disposed basket 6 arranged in said portion $3^a$ of tank 3 and composed preferably of fiber-covered rods 7 stationarily arranged on arc-shaped brackets 8 fixedly mounted on the side of said portion $3^a$ of tank 3, see particularly Fig. 4. Arranged in said tank 3 and on approximately the same horizontal plane with said basket 6, so that said bottles $x$ may be smoothly shifted thereupon, are two rotatably-mounted preferably wooden rollers 9 and 10 extending substantially throughout the greater part of the length of said tank, as shown particularly in Fig. 4. For practical purposes, as long wooden rollers might warp, these rollers 9 and 10 are preferably each made up of a long metallic portion or axle $9^a$ having fixedly arranged thereon outer wooden sectional portions $10^a$, the said rollers 9 and 10 being rotatably mounted in a plurality of similar brackets 11 secured to the side wall of tank 3, as shown in Fig. 3. Arranged above, but in vertical alinement with the space between said rollers 9 and 10, is a series of short preferably wooden rollers 12 adapted to bear against the bottles $x$ to keep the same in frictional engagement with said rollers 9 and 10. Each of rollers 12 is journaled or has a rotatable bearing in arms 13 fixedly mounted on short shafts 14, which are pivotally mounted in brackets 15 secured to the side wall of tank 3, whereby both ends of a roller 12 will rise and fall in unison as a bottle $x$ passes between said roller 12 and said rollers 9 and 10, and whereby also bottles of varying diameter may be accommodated between said rollers 9, 10, and 12. On each of said arms 13 and directly above the spindle portion of rollers 12 is mounted an anti-friction roller 16 upon which a leaf spring 17 mounted on the side wall of tank 3 is adapted to constantly press, so that a yielding pressure is continually exerted on said rollers 12, whereby the bottles $x$ passing between said rollers 12 and said rollers 9 and 10 are maintained in frictional engagement with said rollers 9 and 10 so as to be revolved or rotated thereby.

Slidably mounted in brackets 18 mounted on the side wall of said tank 3 is a preferably squared shaft 19 extending substantially the length of said rollers 9 and 10, see Fig. 3. This shaft 19 is provided with a plurality of fixedly mounted upwardly extending stems or members 20, on which is secured or mounted a long bar 21. Bar 21 is provided with a plurality of spring-pressed tappets 22 arranged equidistantly apart along said bar 21, the space between two tappets 22 being slightly more than the length of a bottle $x$. Each of said tappets 22 is provided preferably with an anti-friction roller 23, which rollers 23 are adapted to lie in the path of the bottles $x$ as they pass rearwardly between rollers 9, 10, and 12, see particularly Fig. 3. By means of a preferably fluid-controlled piston-rod 24 working in a cylinder A suitably mounted in said tank 3, shaft 19 is given a reciprocatory movement parallel with said rollers 9, 10, and 12, whereby on its rearward movement, the bottles $x$, through said tappets 22, are caused to move step by step through said tank 3 and between said rollers 9, 10, and 12, the said bottles $x$ being at the same time constantly revolved or rotated by and between said rollers 9, 10, and 12; on the forward movement of said shaft 19, however, the tappets 22, on contacting, respectively, with the succeeding bottle $x$, are flipped or turned outwardly against the tension of springs 25 to ride past said bottles, so that said shaft 19 and bar 21 have practically an idle movement forwardly. As each bottle reaches the rearward end of said rollers 9, 10, and 12, it is now shifted or projected rearwardly by means of the rearmost tappet 22 on said bar 21 on to a basket 26 similar in shape and construction to said basket 6. Basket 26 is, however, rigidly or fixedly mounted on a gear-wheel 27 adapted to coöperate or mesh with a rack 28 mounted in the sides of, and extending transversely across, said tank 3. Gear-wheel 27 is provided with a stud or short-shaft 29, which is rotatably mounted in a bearing 30, bearing 30 being slidably mounted on rods 31 mounted in the sides of, and extending transversely across, said tank 3, see particularly Figs. 4 and 5. The lower end of short shaft 29 is provided with a roller 32, which is adapted to fit in and coöperate with the bifurcated end of one arm 33 of a bell-crank lever 34. Bell-crank lever 34 is pivotally mounted on a post 35 supported on the base of tank 3, and the other arm 36 of said bell-crank lever 34 is connected to a preferably fluid-controlled piston-rod 37 working in a cylinder B pivotally mounted on a bracket 38 fixedly mounted on said post 35. As a bottle $x$ is shifted upon said basket 26, the piston-rod 37 is caused to operate, as more fully hereinafter appearing, whereby said basket 26, through said bell-crank lever 34, rack 28, and gear-wheel 27, is caused to travel transversely across the tank 3 and at the same time make a half turn or travel through an arc of 180°, bringing the said bottle, with its head now presented toward the front of the machine into operative alinement with a pair of rollers 38 and 39, which rollers 38 and 39 are similar to, but of somewhat shorter length than, said rollers 9 and 10, and are likewise similarly mounted, but on the opposite side of tank 3, see particularly Figs. 3 and 4. Rotatably mounted above and in vertical alinement with the space between said rollers 38 and 39, is an interrupted or broken series of short spring-pressed rollers 40 adapted to coöperate with said rollers 38 and 39, the said rollers 40 being rotatably mounted in arms 13$^a$ fixedly mounted on short shafts 14$^a$ pivotally mounted in brackets 15$^a$ and spring-pressed by springs 17$^a$ and rollers 16$^a$ in a manner similar to that in which said rollers 12 are mounted and spring-pressed as hereinbefore described, and the coöperating action or relation between said rollers 38, 39, and 40 being similar to the coöperating action or relation between said rollers 9, 10, and 12. Also mounted in coöperative relation with said rollers 38, 39, and 40, to shift the bottles $x$ successively now forwardly from said basket 26 and step by step between said rollers 38, 39, and 40, is a series of tappets 41 provided with anti-friction rollers 23$^a$ and similar in all respects to said tappets 22 hereinbefore described and likewise similarly mounted, but on the opposite side of the machine, see particularly Figs. 3 and 4, the shaft 19$^a$ on which said tappets 41 are mounted being, however, reciprocated by a separate piston-rod 42 working in a cylinder C similar to said cylinder A. Thus, as the said basket 26 is caused to travel back and forth, as described, across said tank on the reciprocation of its operating piston-rod 37, the bottles $x$ are successively carried from said rollers 9, 10, and 12, to said rollers 38, 39, and 40, and then shifted step by step between, and from the rearward to the forward end of, said rollers 38, 39, and 40 by said tappets 41 which are reciprocated with their shaft-reciprocating piston-rod 42, the said bottles, while being shifted between said rollers 38, 39, and 40, being also revolved or rotated thereby. In the break in or intermediate the ends of said series of rollers 40, as shown particularly in Fig. 4, are rotatably mounted one or more brushes 43. Each of said brushes 43 is fixedly mounted on a shaft 44 rotatably mounted in the free ends of a yoke 45 pivotally mounted on brackets 46 secured to the outside of the side wall of tank 3, the said brushes being thus adapted to rise and fall to accommodate themselves to the contour of the bottle as the same is shifted on said rollers 38 and 39 therebeneath. We have shown herein two such rotary brushes 43, but it will be obvious and should be understood that one or more of such brushes could be readily used and mounted, if desired. The inner ends of shafts 44 on which said brushes are mounted extend between said yokes 45, see particularly Figs. 1 and 4, and are there preferably joined or connected by a universal joint or flexible coupling 47 of any approved construction; whereby one brush may rise to accommodate the body or enlarged middle portion of a bottle, while the other brush may be washing the neck or narrow portion of a bottle, without retarding or preventing the proper rotation of either or both of said brushes. Each of these rotary brushes 43, as will be seen from Figs. 30 and 31, comprises substantially a hollow disk 48 provided with a hub portion 49 adapted to be keyed or otherwise suitably secured on a shaft 44. The rim 48$^a$ of the disk 48 is provided with a plurality of radially-disposed openings 50 extending into the interior of said disk. The bore of each of said openings 50 is reduced toward the interior of said disk, so as to provide an annular shoulder 50$^a$; and in the enlarged portion of the bore of each of said openings 50 is adapted to fit a brush-socket 51, said brush-socket having on its inner end a small threaded stud 52 adapted to fit in the reduced portion of said opening and project into the interior of said disk to receive a securing-nut 53, whereby said brush-socket is removably held in position. Each of the brush-sockets 51 is adapted to securely hold a number of strands 54 of any comparatively hard, flexible material, preferably fine wire, forming the brush proper, these strands being preferably soldered or otherwise suitably secured in said sockets. One of the side walls of said hollow disk 48 is preferably cut away, as at 55, so that access may be had to the interior of said disk, whereby said brushes may be removed and replaced whenever desired. In the rim 48$^a$ of the disk 48 and preferably alternating with said openings 50, is a plurality of radially-disposed perforations 56 extending into the interior of said disk, whereby, if desired, water supplied to the interior of said disk by any suitable means, such as a nozzle 57 leading from a suitable source of supply, may have exit therefrom on to the bottle during the rotation of said brushes.

The manner in which the brushes 43 are mounted may be compared to a hinge, in which the foremost yoke 45, see Fig. 4, corresponds to the free leaf and the brackets 46 to the rigid or fixed leaf. The pintle 58 of the hinge is secured to said yoke 45 by a set screw 58$^a$ and is provided on its outer end with a bearing 59, in which bearing is rotatably mounted a short shaft 60. The shaft 60 carries on its outer end a beveled gear 61 adapted to be driven by means hereinafter specified, and at its inner end said shaft 60 has a miter-gear connection 62 with the shaft 44 upon which the rotary brush 43 is mounted. It will thus be seen that, as the shaft 60 has a bearing on substantially the same part on which the yoke 45 is pivoted, the miter gear 62 will always remain in mesh as the brushes 43 rise and fall to adapt themselves to the contour of the bottle being shifted therebeneath.

To rotate the said several rollers, each of said rollers 9 and 10 is provided with a like or similar pinion 63, which are adapted to mesh with and be driven by a gear-wheel 64 mounted on a shaft 65 suitably supported by and projecting through the front wall of tank 3, see particularly Fig. 2, and provided on its outer end with a beveled gear 66. Likewise, rollers 38 and 39 are each provided with a similar or like pinion 67 adapted to mesh with and be driven by a gear-wheel 68 mounted on a shaft 69 suitably supported in and projecting through the front wall of tank 3 and provided on its outer end with a beveled gear 70. Rotatably mounted in bearings 71 on the front wall of said tank 3 is a transversely extending shaft 72 provided with beveled gears 73 and 74 adapted to mesh and coöperate with said beveled gears 70 and 66, respectively. On one end, see Fig. 2, said shaft 72 is provided with a sprocket-wheel 75 adapted to be connected by a chain 76 to a sprocket 77 mounted on the main driveshaft 78 suitably mounted in the side of tank 3 and extending thereinto for purposes hereinafter appearing. By this construction, as will be seen, said rollers 9 and 10 and 38 and 39 are adapted to be given a constant rotary motion in the same direction, so that the bottles $x$, as they are shifted step by step along said rollers, will also be constantly rotated, and the upper rollers 12 and 40 will, in turn, be rotated by said bottles, the speed of rotation of said rollers and consequently of said bottles being governed or regulated by the speed of rotation of the main drive-shaft 78 or by the relative size of the respective gear-wheels in the train of gearing between said shaft and said rollers.

Mounted in bearings 79 on the side of tank 3, see particularly Figs. 1 and 4, is a shaft 80, having at one end a miter-gear connection 81 with the main drive-shaft 78 and provided on its opposite end with a beveled gear 82 adapted to mesh with and drive the gear 61, whereby said brushes 43 are caused to rotate, but, as will be seen, in a direction opposite to the direction of rotation of the bottles x,—or in other words, in the same direction as the direction of rotation of said rollers 38 and 39. Now, after the bottles x have been shifted between the rollers 38, 39, and 40, and subjected, as described, to the action of said rotary brushes 43, the bottles x are successively shifted by the next to foremost tappet 41 into an open-ended stationary basket 83 composed of a plurality of preferably fiber-covered rods 84 non-rotatably mounted on suitable brackets 85 secured to the side wall of tank 3, said basket 83 being in horizontal alinement with said rollers 38 and 39 and being substantially similar to baskets 6 and 26. After being shifted into said basket 83, the rotation of the bottles ceases, and from this basket 83 the bottles are successively shifted by the foremost tappet 41 into a basket 86 adapted, as hereinafter described, to raise the bottle from a substantially horizontal position to a vertical position for further washing and cleaning, it being observed that up to this time the bottles have been thoroughly subjected, both exteriorly and interiorly, to a bath of hot water and have also been thoroughly subjected exteriorly to the cleaning action of said rotary brushes 43.

Mounted in, and at substantially the middle of, the forward end of tank 3 is a vertically-disposed cylinder D, and located adjacent and slightly to one side of cylinder D is an elevator-shaft 87 substantially circular in cross-section and within which the said bottles x are adapted to be successively raised or elevated to the top of the machine. This elevator-shaft 87 is preferably composed of sections 88, 89, and 90, each of said sections comprising, respectively, a plurality of vertically-disposed preferably fiber-covered rods 88$^a$, 89$^a$, and 90$^a$. Mounted upon said cylinder D and near the bottom thereof are curved arms or supports 91 upon which the rods 88$^a$ of said lowermost section 88 of the elevator-shaft 87 are mounted, this said section 88, as shown particualrly in Figs. 6 and 10, being composed of said basket 86 when said basket is in raised or vertical position and the rods 88$^a$ fixedly mounted on said curved arms or supports 91, the upper ends of said rods 88$^a$ being secured in a bracket or support 92 also mounted on said cylinder D. It will thus be seen that the basket 86 not only forms part, when in raised position, as shown in Fig. 6, of said elevator shaft, but also provides, so to speak, a pivotally-mounted door for the elevator-shaft 87, this door being open for the successive entrance into said elevator-shaft 87 of the bottles x when the basket 86 is in lowered position and closed when the basket 86 is in raised or vertical position. The rods 89$^a$ of section 89 of the elevator-shaft 87 are mounted and secured between said bracket or support 92 and a bracket or support 93 mounted on the upper frame-work of the machine, these rods, for strengthening purposes, being tied together at suitable intervals by curved tie-members or rings 94 and 95 provided with a cut-away portion, as at 96, see particularly Fig. 9, for purposes hereinafter appearing, and between which rings or tie-members 94 and 95 the rear rods 89$^a$ of said elevator-section 89 are broken off to provide a space, as at 97, also for purposes hereinafter appearing. Pivotally mounted in brackets 98 arranged on said ring or tie-member 94 is a forked plate 99. This plate 99 is adapted to normally lie in a horizontal position within and across the elevator-shaft 87, see particularly Figs. 6 and 12, and is so arranged that, while it is adapted to be pivotally raised in the space 97, as shown by dotted lines in Fig. 6, it cannot fall below a horizontal, the connection between said plate 99 and said brackets 98 being substantially a rule-joint. The front bars 90$^a$ of elevator-section 90 are fixedly mounted and arranged between said bracket or support 93 and a bracket 100 secured to the frame-work of the machine, while preferably the two rear rods or bars 90$^a$ of said elevator-section 90 are mounted on short curved arms 101 pivotally connected to the said brackets 93 and 100, as shown particularly in Fig. 8, whereby said rear rods 90$^a$ may be spread apart or opened like a swinging double door, for purposes hereinafter appearing, said rear rods 90$^a$ being yieldingly held in normal or closed position by a coiled spring 102 suitably attached thereto and at the bottom thereof, see particularly Fig. 8. The said basket 86 is of substantially the same shape as basket 6, but has, at its front end, a forked end or back-plate 103, see particularly Fig. 10, against which the bottles x are adapted to successively contact or bear when shifted into said basket 86. Attached to the under side of said forked plate 103 is a pair of brackets 104, which are hinged to a similar pair of brackets 105 suitably secured to the said curved arms or supports 91. The basket 86 is also provided with an arm 106 pivotally connected to a preferably fluid-controlled piston-rod 107 working in a cylinder E, whereby, when said piston-rod 107 is actuated or reciprocated in its said cylinder, the basket 86 will be raised or lowered from a substantially horizontal position to a vertical position, and vice versa, the cylinder E, as shown in Fig. 5, being pivotally mounted on a bracket 108 secured to said cylinder D. Thus, for instance, after a bottle x has been shifted into said basket 86, the piston-rod 107 is timed to be properly actuated, whereupon the basket 86 will be pivotally raised from the position shown in Fig. 5 to the position shown in Fig. 6, and the position of the bottle x therein will be correspondingly changed from a substantially horizontal position to a vertical position with its head presented downwardly, the bottle being now in proper position to be raised or elevated in said elevator-shaft 87, as will now be described.

Working in cylinder D is a preferably fluid-controlled piston-rod 109, on the upper end of which is fixedly secured an arm 110 which extends outwardly to one side of said piston-rod 109, see Fig. 7, and from which arm is fixedly suspended a preferably squared shaft or rod 111. As will thus be obvious, whenever piston-rod 109 is actuated or reciprocated, the rod 111 will be raised or lowered therewith. Fixedly secured to the lower end of said rod 111 is a bracket 112, to which is pivotally connected by a rule-joint 113 an arm 114 provided with a series of fingers 115. Adjacent the upper end of said rod 111, an arm 116 provided with a series of fingers 117, similar in all respects to said arm 114 and fingers 115, has a rule-joint connection with a block or member 118 slidably mounted on said rod 111. While the normal position of said block 118 is adjacent the upper end of said rod 111, the block 118 has a yielding bearing on said rod, for purposes hereinafter appearing, said block being arranged between two coiled springs 119 and 120 on said rod 111, see particularly Fig. 7, the lower end of spring 120 bearing against a collar 121 fixedly secured on said rod 111, and the upper end of spring 119 bearing against the under side of said arm 110.

It will be seen from Figs. 4 and 5, that the basket 86 is arranged on an angle inwardly from said basket 83 toward said elevator-shaft 87, so that the bottles x may be successively brought to proper position to be delivered into said elevator-shaft 87; and it will also be noted that basket 86, when in lowered position, is preferably inclined slightly downwardly toward its rear, so that the said bottles x will more readily fall thereinto when successively shifted from said basket 83. Now, after a bottle x has been shifted into said basket 86 and said piston-rod 107 properly actuated, said basket 86 will be raised to vertical position, thereby forming, as described, part of said elevator-section 88 and delivering said bottle x into said elevator-shaft, said bottle resting for the time being, with its head or neck down, upon said forked end-plate 103. The said piston-rod 109 is now actuated upwardly and arm 114 thereby also moved upwardly, whereupon the fingers 115 will pass through said forked end-plate 103 and engage and carry upward the said bottle x to a point above said forked-plate 99, the plate 99 being raised out of the path of said bottle by said bottle contacting thereagainst and held by the bottle in such raised position until the bottle has been carried to a point thereabove, when said plate 99 will drop again to a horizontal position. When the piston-rod 109 is reversely or downwardly actuated, said arm 114 with the bottle x upon the fingers 115 thereof will also be carried downwardly, but in such downward movement or travel, the said bottle will be caught by said forked-plate 99 and continue to rest thereon until again and further raised. During the said upward travel of said arm 114 just described, the basket 86 has been lowered to receive a second bottle x and again raised to place said second bottle x in the elevator-shaft 87, and on the said downward travel of said arm 114, the said arm 114 will be flipped upwardly by said bottle against a flat spring 122 on said rod 111 and will thus ride past said second bottle until it reaches a point beneath said bottle when it will again assume a horizontal position. And on said downward travel of said rod 111, the said upper arm 116 also will be flipped upwardly by said first bottle x now resting on said plate 99 to pass said bottle, as will be obvious, said arm 116 also again assuming a horizontal position after it has reached a point beneath said plate 99. Now, when said piston-rod 109 is again actuated upwardly, said second bottle x will be carried upwardly to rest upon said forked plate 99, the same as heretofore described in connection with said first bottle x, while the said first bottle x will be caught by the fingers 117 of plate 116 and thereby carried up and into the top section 90 of the elevator-shaft 87 until it contacts with a series of horizontally-disposed rods or bars 123 extending between end-frames 1 and 2, when said bottle is in position to be grasped by a pair of reciprocating upper carrying jaws 124 hereinafter described and removed from said elevator-shaft 87, the said rear rods 90ª being forced apart against the tension of said spring 102 by said bottle as the same is being removed from said elevator-shaft. The throw of piston-rod 109 is slightly more than is required to carry the bottles to the top of the elevator-shaft, but as the upper arm 116 is slidably and yieldingly mounted on said rod 111, as described, the bottle will be held against the bars 123 a sufficient length of time to be grasped by said pair of jaws 124, and at the same time the said springs 119 and 120 act to absorb or take up any shock or jar which might be imparted to the bottle on coming into contact with said bars 123, thus preventing any damage to or breakage of the bottles. Thus, as described, the bottles x are successively carried from said tank 3 to the top of said elevator-shaft for further handling and cleaning now to be described.

Having sliding bearing in bearings or journals 125 at the top of end-frames 1 and 2 are like shafts or tie-rods 126 and 127 spaced a short distance horizontally apart, and upon which shafts 126 and 127 and spanning the space therebetween are rigidly or fixedly mounted or supported a plurality of similar castings or members 128, each of which castings is suitably strengthened or reinforced on its under surface by ribs 128a, see particularly Fig. 16. As the said castings 128 are similar in construction, the construction of but one casting will be described here.

Each casting 128 is provided with two like pairs of upstanding ears 129, one pair of said ears being adjacent each tie-rod 126 and 127, and in each pair of ears 129 is pivotally mounted a lever 130. The lower end of each of said levers 130 is pivoted, as at 131, to an arm 132 carrying on their inner ends the jaws 124. Each of said arms 132 extends outwardly, see particularly Fig. 14, beyond said pivot-point 131 and at its outer end is pivotally connected by a pin 133 to a link 134, the opposite end of each link 134 being pivotally connected by a pin 135 to a pair of ears or brackets 136 outstanding or projecting from the casting 128, as shown clearly in Fig. 14. Mounted in a tapered opening 137 in approximately the center of casting 128 and rigidly or fixedly secured therein by a nut 138 is an upright post 139 provided at its upper end with a stop-collar 140 secured thereon by a nut 141. Slidably mounted on post 139 is a member 142 having an enlarged bore 143 in its lower end, within which bore and coiled on said post 139 is adapted to fit a coiled spring 144, spring 144 being interposed between the top of said enlarged bore of said member 142 and the top of said casting 128 and adapted to exert a constant upward pressure on said member 142 tending to force the same upwardly. Integral with said member 142 and extending outwardly therefrom are arms 145 having anti-friction rollers 146 rotatably mounted in the outer ends thereof, which rollers are adapted to coöperate with or ride upon cam surfaces 130a on the inner side of the upper portions of levers 130. Thus, when said member 142 is free to be moved upwardly by said spring 144, said rollers 146 will ride up said cam surfaces 130a, thereby forcing the upper ends of levers 130 apart and at the same time forcing the jaws 124, carried, as described, on the lower ends of said levers, together. At the upper end and preferably flush with the top of said member 142 is a pair of outstanding lugs 147 having flat upper faces, upon each of which is adapted to bear an anti-friction roller 148 rotatably mounted in an arm 149 rigidly secured on a rock-shaft 150 supported by means of a plurality of reinforced triangular castings 151 mounted and supported at their lower corners upon the tie-rods 126 and 127, the castings 151 alternating on said tie-rods with said castings 128. Rock-shaft 150 has keyed or otherwise suitably secured to its outer end a depending arm 152 pivotally connected to a preferably fluid-controlled piston-rod 153 working in a cylinder F pivotally mounted on tie-rod 126, see particularly Figs. 2 and 19. As shown in Fig. 1, there are mounted or supported on said tie-rods 126 and 127 eleven castings 128 carrying the upper jaws 124, and to each side of and between which is a casting 151, or, in all, twelve castings 151, these castings 128 and 151 being so arranged and tightly fixed between the ends of said tie-rods 126 and 127 that they will be reciprocated back and forth lengthwise across the machine with said tie-rods when said tie-rods are caused to reciprocate as hereinafter described. From the above, it will be seen that, when the piston-rod 153 is actuated in one direction, the arms 149 and their carried rollers 148 force the member 142 downwardly against the tension of said spring 144, allowing said jaws 124 to open to release the bottle, and when actuated in the opposite direction, the arms 149 will be raised, permitting said member 142 to move upwardly under the tension of said spring 144, and in this upward movement of said member 142, the rollers 146 ride up said cam surfaces 130a, thereby forcing said jaws 124 together to grasp the bottle. On each of said pins 133 and 135 and to each side of each of said links 134, is a short sleeve 154, each of which is provided with an annular groove 154a. A spring 155 is arranged on each side of each of said links, one end of each spring 155 being secured or coiled in a groove 154a of the sleeves 154 on pins 133, and the other end of each spring being brought up into a groove 154a of the sleeves 154 on pins 135 and then over said sleeves 154 on pins 135 to bear against or engage the casting 128 in such a manner that the springs 155 exert a constant pull tending to keep said jaws 124 open or apart. Thus, after said member 142 has been forced downwardly against the tension of said spring 144, as before described, to allow said jaws 124 to open, the springs 155 act to force said jaws apart into open position, as shown in Fig. 14. In order that the said jaws 124 may always be maintained in proper position to evenly and firmly grip the bottle, or, in other words, move on a horizontal line perpendicular to the bottle, each of said links 134 is provided with an adjusting screw 156, whereby the length of said links may be exactly and accurately adjusted to keep said arms 132 carrying said jaws 124 horizontally disposed. Fixed to or integral with preferably one of the castings 151, and near end-frame 1, is a stud or projection 157 secured at its outer end to a preferably fluid-controlled piston-rod 158 working in a cylinder G mounted on the upper end of end-frame 1, as shown in Fig. 19. Thus, when the piston-rod 158 is caused to reciprocate in its cylinder G, as hereinafter described, the said tie-rods 126 and 127 and their carried castings will be likewise reciprocated, for purposes hereinafter appearing.

Mounted upon and extending between end-frames 1 and 2 at a suitable distance below said tie-rods 126 and 127, and spaced horizontally a suitable distance apart, are two like pairs of tie-rods 159 and 160, upon each of which pairs of tie-rods are mounted a plurality of lower-jaw supporting-members or castings 161. Extending through each series of castings 161 on each of said pairs of tie-rods 159 and 160 and rotatably mounted therein is a rock-shaft 162, and fixedly mounted on each of said rock-shafts 162 are a plurality of members or castings 163—one for each lower jaw. As the construction of the lower jaws and their supporting-castings is similar, but one lower jaw and its supporting-casting will be here described. Each of the said castings 163 comprises substantially a pair of arms 164 spaced apart and connected or tied together at their outer ends by upper and lower cross-bars or members 165 and 166, respectively, the arms 164 being provided at their inner ends with suitable openings to fit said rock-shaft 162, said arms being keyed or otherwise suitably fixed on said rock-shaft. Each of the cross-bars 165 and 166 and between said arms 164 is provided with a securing-screw 167. Between said arms 164 and on said rock-shaft 162 is mounted a bell-crank lever 168, said bell-crank lever being secured to said casting 163 by means of said screws 167 and the position of the arms 169 and 170 of said lever 168 being adjusted or controlled by said screws 167, whereby the throw of arm 170 of said lever 168 may be readily regulated, for purposes hereinafter appearing. The end of arm 170 of said lever 168 is pivotally connected to a block 171 slidably mounted or arranged in a cylinder 172. Cylinder 172 is provided on its outer surface at its forward end, see Fig. 14, with a perforated lug 173, which is adapted to fit between and have pivotal connection with a pair of ears 174 integral with and extending outwardly from a jaw 175. Also integral with said jaw 175 is a pair of laterally extending or projecting ears 176, each of which carries a horizontally disposed stem 177 having a sliding bearing in a projection or g 178 upstanding from said casting 161. Within said cylinder 172 and interposed between the front inner end thereof and the forward end of said block 171, is a coiled spring 179 forming practically part of said block 171. Not only do the springs 179 absorb shocks or jars when the jaws 175 grasp the bottle, but, due to said springs, after said jaws have been adjusted to grasp a bottle of a certain diameter, said jaws are practically self-adjusting to accommodate and grasp bottles of a larger diameter. Each of said rock-shafts 162 has fixedly secured on its forward end an arm 180, each of said arms being pivotally connected to a similar pair of links 181, which pairs of links are, in turn, pivotally connected to the upper end of a preferably fluid-controlled piston-rod 182 adapted to work in a cylinder H mounted on the end-frame 1. It will, of course, be understood that the lower-jaw supporting-members or castings 161 are supported on said pairs of tie-rods 159 and 160 in pairs, as shown particularly in Fig. 14, so that the jaws 175 supported by two opposite castings 161 will coöperate together to properly grasp and hold a bottle x therebetween. Thus, when said piston-rod 182 is actuated upwardly, the rock-shafts 162 are rocked, through said links 181 and arms 180, in opposite directions or toward each other, whereby the castings 163 are likewise rocked and arms 170 of said bell-crank levers 168 are thrown to move said cylinders 172 and their carried jaws 175 inwardly to grasp the bottle. When the piston-rod 182 is reversely or downwardly actuated, the jaws, as will be obvious, are opened to release the bottle. As the inward and outward movements of the cylinders 172, as will be noticed, are on an arc, and as the jaws 175 should firmly and evenly grip the bottle, the said cylinders 172 are, therefore, each given, as described, a pivoted connection with its jaw 175, and each jaw 175 is prevented, by means of said carried stems 177 sliding in said fixed bearings 178, from assuming, when moved inwardly and outwardly, other than a perpendicular position with respect to said bottle. As will be seen in Fig. 1, there is one more pair of upper carrying jaws 124 than of lower holding jaws 175, the foremost pair of carrying jaws 124 being adapted to be reciprocated into and out of said elevator-shaft to successively shift the bottles therefrom into proper position to be grasped and held by the foremost pair of lower holding jaws 175. It will also be observed that the lower holding jaws 175 do not move horizontally across the machine, the tie-rods 159 and 160 on which said lower-jaw supporting-castings 161 are fixedly mounted, being rigidly and fixedly mounted on said end-frames 1 and 2. It will further be observed that when the pairs of upper carrying jaws 124 and the pairs of lower holding jaws 175 are in the relative positions shown in Fig. 1, the said pairs of upper carrying jaws are in vertical coöperative alinement with the lower holding jaws, the foremost pair of upper carrying jaws being above said elevator-shaft 87. Now, after said first bottle hereinbefore mentioned has been raised to the top of said elevator-shaft 87 into proper position to be grasped by said foremost pair of upper carrying jaws, the piston-rod 153 is actuated to cause said jaws to close to grasp said bottle. After the said bottle has been thus grasped, the piston-rod 158 is properly actuated to move said tie-rods 126 and 127 and said several pairs of upper carrying jaws rearwardly, said bottle being thus removed from said elevator shaft by said foremost pair of upper carrying jaws to between the foremost pair of lower holding jaws. The piston-rod 182 is then actuated to cause said lower holding jaws to close to grip and hold the said bottle. After the bottle has been so gripped by said foremost pair of lower holding jaws, said piston-rod 153 is reversely actuated to open said pair of upper carrying jaws to release said bottle, and said piston-rod 158 is then reversely actuated to rearwardly move said tie-rods 126 and 127 and their carried castings to bring said foremost pair of upper carrying jaws again in proper position to remove said second bottle, which has now been elevated to the top of said elevator-shaft, from said elevator-shaft, and to bring also the next foremost pair of upper carrying jaws into proper vertical alinement with said foremost pair of lower holding jaws. The piston-rod 153 is again actuated to cause said upper carrying jaws to close to grasp the said bottles; then the piston-rod 182 is actuated to open said lower holding jaws to release said bottles; and then the piston-rod 158 is properly actuated to move rearwardly said pairs of upper carrying jaws, carrying therewith the said bottles, and so on, the several piston-rods being each reciprocated at the proper time to perform its respective function and the bottle $x$ being successively taken from said elevator-shaft 87, carried by said pairs of upper carrying jaws 124 through said series of lower holding jaws 175, and successively delivered, thoroughly cleaned both exteriorly and interiorly, into a discharge-chute 183, the said bottles while being so carried through said series of lower holding jaws 175 being given a thorough cleaning interiorly, as will shortly be described. The chute 183 is preferably also composed of fiber-covered rods 183$^a$, the rods 183$^a$ at their lower ends being preferably curved outwardly or rearwardly to carry the bottles $x$ from the machine or on to a suitable conveyer or carrier, not shown, if desired. This chute 183 is also preferably provided with an outwardly-opening double door similar to the door in the upper end of elevator-shaft 87 before described, the upper brackets 183$^b$, however, being flared outwardly to receive the bottle. After a bottle has forced said door open and has been released into the chute 183, the said door immediately closes, preventing the bottle falling forwardly into the machine.

The jaws 124 and 175 are similar in construction, but, as will be seen from Figs. 14, 16, 17, and 18, the jaws 124 are of somewhat shorter length than the jaws 175. Each of said jaws comprises an arc-shaped backplate 184 provided with one or more perforations near its outer edges, in which perforations are adapted to be removably secured vertically-disposed bottle-grasping members 185, see particularly Figs. 14 and 18. Each of said bottle-grasping members 185 comprises a bar or strip 186 provided with one or more preferably integral threaded stems 187 adapted to extend through said perforations in said plate 184 and be removably secured therein by securing-nuts 188. Each of said bars or strips 186 is also removably faced with a material 189, such as preferably chamois skin, adapted to frictionally engage the surface of the bottle, this material 189 being secured thereon in any suitable manner, such as preferably by having the edges thereof stitched together across the back of said bar or strip 186. As will be obvious, this material or chamois skin, when worn, may be readily removed and replaced.

The inner end of drive-shaft 78 is provided with a beveled gear 190, which is adapted to mesh with a beveled gear 191 secured on a vertically-disposed preferably squared shaft 192 mounted on the base of tank 3. 193 and 194 indicate castings slidably mounted, respectively, on said shaft 192 and post 35, in which castings, and extending on opposite sides of said shaft 192 and post 35, are mounted tie-rods 195 and 195$^a$, and on these tie-rods 195 and 195$^a$ are mounted a plurality of castings 196 and 197, said castings 196 and 197 being alternately arranged on said tie-rods 195 and 195$^a$ between said castings 193 and 194. As the said castings 196 and 197 are, respectively, alike in construction, the construction of but one of each of said castings 196 and 197 will be here described. Each of castings 196, as shown particularly in Fig. 21, comprises a plate 198 adapted to straddle the space between said tie-rods 195 and 195$^a$ and provided on each side with a tubular portion 199 adapted to fit on said tie-rods. In its center and on its top and bottom, as shown particularly in Figs. 20 and 21, said plate 198 is provided with similar and alining bosses 200 and 201, respectively. 202 indicates a bore extending through said bosses 200 and 201 and plate 198, and in this bore is adapted to be mounted a bushing 203. Rotatably mounted in bushing 203 is a tubular member 204 provided on its lower end with an outwardly projecting flange 204$^a$ adapted to abut against the under face of said boss 201, see Fig. 20. Keyed or otherwise suitably secured to said tubular member 204 and bearing upon the upper face of said boss 200, is a gear-wheel 205. Castings 197 are somewhat similar to castings 196, each of said castings comprising a plate 206 adapted to straddle the space between said tie-rods 195 and 195$^a$ and provided on each side with a tubular portion 207 adapted to fit on said tie-rods, see particularly Fig. 27. In its center and on its upper and lower surfaces, said plate 206 is provided with similar and alining bosses 208 and 209, respectively. Likewise, the said plate 206 and bosses 208 and 209 are provided with a vertically-disposed bore 210, in which is adapted to fit a spindle 211. This spindle 211 is provided at its upper end with an enlarged portion 212, on which is rotatably mounted an idler gear-wheel 213, the gear-wheels 213 of said castings 197 being adapted to mesh and coöperate with the gear-wheels 205 of said castings 196, see particularly Figs. 26 and 27. This gear-wheel 213 is adapted to rest on a washer 214 supported on the top of said boss 208 and to be held in position by a head 215 on said spindle, the lower end of said spindle being threaded to receive a securing-nut 216, whereby said spindle is firmly held in place, a washer 217 being interposed between said nut 216 and the under face of said boss 209, if desired. Each of said tubular members 204 of each of said castings 196 is threaded at its upper end, see particularly Fig. 20, to receive a clamping-nut 218, said nut being screwed down on said member 204 to bear lightly upon said gear-wheel 205 to hold the same in position. Each of said nuts 218 is provided with an outwardly projecting and overhanging flange 219 adapted to loosely surround an upstanding perforated boss or projection 220 on a cover-plate 221. This cover-plate 221, as shown in Fig. 1, extends from post 35 to slightly beyond said shaft 192, covering all said castings 196 and 197 strung on said tie-rods 195 and 195$^a$ and also said casting 193, said cover-plate 221 being provided with one of said bosses 220 in proper coöperative vertical alinement with each of said castings 196 and also said casting 193. The outer side edges of cover-plate 221, as seen in Fig. 20, are adapted to rest and be supported upon vertically-disposed side walls 222, said side walls 222 extending completely around and encircling said series of castings 196 and 197 and also said end casting 193 and being supported or resting upon said tubular portions 199 and 207 of said plates 198 and 206, respectively. The side walls 222 are provided with a plurality of inwardly-projecting perforated lugs 223, there being preferably two such lugs for each casting 196 and 197, and through which lugs are adapted to pass cap-screws 224, said screws 224 extending into coöperating lugs or bosses 225 on said castings 196 and 197, whereby said walls 222 are securely held in place. The cover-plate 221 is also provided with a plurality of outwardly-extending perforated lugs 226, through which cap-screws 227 are adapted to pass and extend into coöperating perforated lugs 228 outwardly-extending from said side walls 222, whereby said cover-plate is firmly secured in position. If desired, suitable packing 229 may be interposed in the joint between said cover-plate and said side walls, see particularly Fig. 20. It will thus be seen from the construction just described that a housing 230 inclosing and surrounding the entire train of gear-wheels is provided, wherein a suitable lubricant may be placed to keep said train of gear-wheels lubricated, the overhanging flange 219 of nuts 218 being adapted to not only prevent the escape of lubricant from, but also prevent the entrance of water or other foreign matter into, said housing 230.

The casting 193 is similar to, but somewhat larger than, the castings 197, the gear-wheel 213$^a$ mounted thereon being also somewhat larger than the gear-wheels 213, serving as a master-gear. As shown in Fig. 26, the side walls 222 are made circular in horizontal section to inclose said master-gear, and the forward end of cover-plate 221 is correspondingly circular in shape to cover said master-gear. This casting 193, however, is not provided with a fixed spindle similar to the spindles 211 heretofore described, the said master-gear 213$^a$ being slidable on said shaft 192 and having a non-circular bore corresponding to the cross-section of said shaft 192, see Fig. 26, so as to be rotated thereby, said master-gear 213$^a$ being held in position on said shaft by a clamping nut 231 similar to clamping nuts 218. It will be seen from Fig. 26 that the gear-wheels 205 and 213 of said castings 196 and 197, respectively, are preferably all of the same size and mesh one with the other to form a continuous train, the foremost gear-wheel 205 meshing with said master-gear 213$^a$, whereby, on the rotation of said shaft 192, the entire train of gear-wheels and their carried parts will be rotated. As the gear-wheels 205 of said castings 196 should preferably rotate in the same direction to rotate in the same direction the brush-carrying members and their carried brushes hereinafter described, the gear-wheels 213 of said castings 197 are preferably idlers, for well-understood purposes. The said casting 194, slidably mounted on said post 35 and which serves to support the rearward ends of said tie-rods 195 and 195ª, as before stated, is also quite similar to castings 197, but is further provided with laterally-projecting lugs 232 on which is mounted by eye-bolts 233 a bar 234, said bar 234 being preferably circular in cross-section and adapted to coöperate with the valve-operating levers to operate the valve mechanism hereinafter described. In preferably the central casting 197ª of said series of castings 197 mounted on said tie-rods 195 and 195ª, the spindle 211, instead of being provided on its lower end with a securing-nut 216, as hereinbefore described, is extended downwardly to form a preferably fluid-controlled piston-rod 235 adapted to work in a cylinder I supported on the base of tank 3, see particularly Figs. 1 and 3. Thus, whenever piston-rod 235 is reciprocated, said tie-rods 195 and 195ª and the parts mounted thereon or carried thereby will be likewise reciprocated vertically.

Fixedly mounted on each of said end-frames 1 and 2 and extending inwardly therefrom, is a pair of short heavy bars 236 and 236ª, respectively, on the inner ends of each pair of which bars is mounted a cross-bar 237. Mounted in said cross-bars 237 and spanning the space across the machine therebetween, is a pair of tie-rods 238 spaced horizontally a short distance apart, see particularly Fig. 24. Mounted on said pair of tie-rods 238 and adjacent each of said cross-bars 237 is a casting 239, the rearward casting 239 being adapted to support the upper end of said post 35, and the forward casting 239 being adapted to provide a bearing for the upper end of shaft 192. It might be added that the upper end of said shaft 192 is preferably rounded, so that said shaft 192, while firmly supported by its said casting 239, is free to smoothly rotate therein. Also mounted on said tie-rods 238 and between said castings 239, is a plurality of like castings 240. Each of these castings 240 is provided on each side with a laterally-projecting tubular portion 241, through which said tie-rods 238 pass or extend. Each casting 240 is also provided with an upwardly-extending boss 242, which is provided with a vertically-disposed bore 242ª, this bore 242ª extending downwardly through said casting 240, as shown particularly in Fig. 24. It will be understood that there are preferably as many such castings 240 strung on said tie-bars 238 as there are tubular-members 204, on which tubular-members 204 the vertically-acting brushes hereinafter described are carried, and that the bore 242ª through each of said castings 240 is arranged in proper vertical coöperative alinement with one of said tubular-members 204.

As will be hereinafter more fully described, the four right-hand tubular members 204, as shown particularly in Fig. 1, are adapted to be connected with a suitable source of hot water supply, while the four left-hand tubular members 204 are adapted to be connected with a suitable source of cold water supply. We, therefore, preferably arrange around the four right-hand castings 240 and around the four left-hand castings 240 like U-shaped trough members 243 and 243ª, respectively, the inner walls of said trough members being preferably connected together as shown in Fig. 1. The inner leg 243$^b$ of each of said troughs is somewhat shorter than the outer leg 243$^c$ thereof, as shown clearly in Fig. 24, and is secured to said castings 240 by means of a plurality of bolts 244 screwed into a longitudinally-extending lap 245 on said castings 240, whereby said troughs are firmly held in proper position. Fixedly secured to the upper end of each of the said tubular-members 204 is a hollow shaft 246, having its bore in alinement with the bore of its tubular-member 204, said hollow shaft 246 extending up into close proximity to its coöperating casting 240 and in proper vertical alinement with the vertical center of the bore 242ª thereof. Either integral with or suitably secured on the lower end of said hollow shaft 246 is a flanged member 247 provided on its lower end with pins or studs 248 adapted to fit into perforations in the upper end of said tubular-member 204. Threaded on the upper end of said tubular-member 204 above said nut 218 and adapted to engage the flange of said member 247, is a flanged nut 249. It will thus be seen that, when said nut 249 is screwed down upon said flanged member 247, said hollow shaft 246 will be firmly attached to said tubular-member 204, so as to be rotated therewith.

Each of said castings 196 is also provided on each side with a laterally-extending boss 250, in which are adapted to be threaded eye-bolts 251 secured in position by suitable jam-nuts 251ª. Slidably arranged in each of said eye-bolts 251, and on each side of each casting 196, is a vertically-disposed rod 252 provided on its lower end with adjustable stop-nuts 253. The upper end of each of said rods 252 is threaded into an enlarged portion 254 on the lower end of a vertically-disposed rod 255 arranged above and in alinement with said rod 252, said rods 252 and 255 being held together by a suitable jam-nut 256, see particularly Fig. 24. Each of said rods 255 extends upwardly into a cylindrical shell 257, each of which shells is threaded on its lower end into and through an upwardly-extending boss 258 in the bottom of, and preferably integral with, said troughs, and each of said shells 257 being firmly held in proper position by a jam-nut 259. The lower end of each of said shells 257 projects a short distance below the bottom of said trough and has threaded thereon a nut 260 provided with an inwardly-projecting circular flange 261 adapted to form the bottom of said shell, said shell being preferably closed at its upper end by a threaded cap 262. The upper end of each of said rods 255 within its shell 257 is provided with a collar 263 secured thereon by a suitable nut 264, and coiled on said rod and interposed between said collar 263 and said flange 261 of said nut 260 is a coiled spring 265, for purposes hereinafter appearing. The enlarged portion 254 of each of said rods 255 is provided with an annular groove 266, and adapted to removably fit in said annular grooves and spanning the space between said rods 255, is what might be called a yoke-member 267, see particularly Figs. 24 and 25. This yoke-member 267 is preferably cast in one piece and comprises laterally-extending portions 268, upwardly and inwardly curved leg-portions 269, and a cross-piece 270 connecting the inner ends of said leg-portions 269. Each of said portions 268 is provided with a cut-out portion, as at 271, see particularly Fig. 25, adapted to coöperate with said annular grooves 266 when said yoke-member 267 is in operative position, each of said portions 268 being also provided with a spring-pressed pin 272 provided with a knob 272ᵃ, whereby said yoke-member 267 is adapted to be removably held in said operative position, as shown particularly in Fig. 24. The upper end of each of said hollow shafts 246 is adapted to project into the bore 273 of a tubular-member 274. Each of the tubular-members 274, at its upper end, is slidably arranged in the bore 242ᵃ of a boss 242, a suitable bushing 275 being preferably interposed, and at its lower end extends through an opening in said cross-piece 270 of said yoke-member 267, the outside diameter of said member 274 at this point being slightly reduced to provide a shoulder 276, whereby said tubular-member 274 is mounted upon and supported by said yoke-member 267, the lower end of said tubular-member 274 being preferably threaded to receive a nut 277, so that the parts may be properly held together. The upper portion of said bore 273 of said member 274 is enlarged, as at 273ᵃ, see Fig. 24, to receive a bushing 278 having its upper end 278ᵃ preferably flaring. The upper end of the hollow shaft 246, which projects into said bushing 278, is provided with a threaded nipple 279, on which is threaded a hollow brush-carrying member 280 provided with a plurality of obliquely-upwardly extending ports 281. 282 indicates a plunger arranged in the upper end of said brush-carrying member 280 and adapted, when said brush-carrying member is in lower position, to close said ports 281. And in the bore of said brush-carrying member 280, and interposed between said plunger 282 and a small collar 283 on the upper end of said nipple 279, is a small coiled spring 284 adapted, when said brush-carrying member 280 is raised upwardly out of said bushing 278, to spread the brushes hereinafter described carried by said brush-carrying member diagonally outwardly and, at the same time, open communication between said ports and the bore of said brush-carrying member.

In our machine, in order that the entire interior surface of the bottle, both sides and bottom, may be thoroughly cleaned, we prefer to mount two series of vertically-movable rotating brushes, such as shown in Figs. 28 and 29, the pair of brushes shown in Fig. 28 being adapted particularly to clean the interior sides of the bottle and the single brush shown in Fig. 29 being adapted particularly to clean the interior surface of the bottom of the bottle. Accordingly, preferably throughout the machine, said brush-carrying members 280 are adapted to alternately carry said interior-side cleaning brushes and said interior-bottom cleaning brush; for instance, the foremost brush-carrying member shown in Fig. 1 may be adapted to carry the bottom-cleaning brush shown in Fig. 29, in which event the next to foremost brush-carrying member shown in Fig. 1 will preferably be adapted to carry the interior-side cleaning brushes shown in Fig. 28, and so on throughout the series of brush-carrying members.

Referring now particularly to Fig. 28, on the top of the brush-carrying member 280 there are shown are pivotally mounted a plurality of brush-sockets 285, in each of which sockets a brush member 286 is suitably mounted, each of said brush members comprising a plurality of comparatively hard, flexible strands of any suitable material, preferably wire. Fixedly secured to or integral with the lower end of each of said sockets 285 is a teat 287. These teats are adapted to coöperate with said plunger 282 to spread said brushes 286 diagonally outwardly into operative position as shown in Fig. 28 when said plunger is forced upwardly under the tension of said coiled spring 284 after the said brushes 286 have been raised upwardly out of said bushing 278, the teats 287 being so mounted and arranged with respect to said sockets 285 that the point of each teat is to one side of the pivot-point of each socket and also to one side of the vertical axis of said plunger 282, as seen clearly in Fig. 24.

Referring now particularly to Fig. 29, on the top of the brush-carrying member 280 there shown is pivotally mounted a single brush-socket 285ª, in which a brush member 286ª is suitably mounted, said brush member 286ª likewise comprising a plurality of comparatively hard, flexible strands of any suitable material, preferably wire. This socket 285ª is provided to one side of its pivot point with a teat 287ª, whereby, after said brush 286ª has been raised upwardly out of its bushing 278 and said plunger 282 then forced upwardly under the tension of said spring 284, the brush member 286ª will be but slightly tilted into the operative position shown in Fig. 29, so as to contact with and clean the interior surface of the bottom of the bottle.

Threaded or otherwise secured to the lower end of each tubular-member 204 is a tubular-member 288, having its bore in alinement with the bore of its tubular-member 204. As shown in Fig. 1, the tubular-members 288 of the four right-hand rotating vertically-acting brushes are adapted to communicate preferably with a source of hot water supply under pressure, while the tubular-members 288 of the four left-hand rotating vertically-acting brushes are adapted to communicate preferably with a source of cold water supply under pressure; but as the connections between each of said two sets of tubular-members 288 and its respective water supply are similar, the connections between said right-hand set and its water supply will only be here described, the said description being applicable to the connections between said left-hand set and its water supply, it being understood, however, that, as stated, said right-hand set communicates preferably with a supply of hot water under pressure, while said left-hand set communicates preferably with a supply of cold water under pressure. 289 indicates a pipe composed of elbows 290 and 291, T's 292, and short sections of tubing 293. The said elbows 290 and 291 connect, respectively, the rearmost and foremost tubular-members 288 of said right-hand set with the pipe 289, while said T's 292 connect the intermediate tubular-members 288 of said right-hand set thereto. As this pipe 289 moves vertically with its set of tubular-members 288 as the same are reciprocated vertically under the action of said piston-rod 235 working in said cylinder I, and also as said tubular-members 288 rotate in said elbows and T's when said tubular-members 204 are rotated by said train of gearing hereinbefore described, in order that leakage between said elbows and T's and said tubular-members 288 will be prevented, and in order also that said pipe 289 may be carried vertically with its set of tubular-members 288 and said tubular-members 288 be free to rotate at the same time in said elbows and T's, we slightly enlarge the bore in the upper portion 294 of each of said elbows and T's and also externally thread said upper or vertically-disposed portion 294 of each of said elbows and T's to receive a flanged clamping-nut 295, which nut is adapted to be screwed down and impinge upon an annular or circular shoulder 296 on the upper end of a sleeve or member 297 brazed or otherwise suitably secured to the tubular-member 288 and extending down into or arranged in said enlarged bore of the vertically-disposed portion 294 of said elbow or T, whereby the parts are not only held properly together, but said tubular-members 288 are also free to rotate. Suitable packing 298 may be provided in said enlarged bore of said portions 294 of said elbows and T's, as shown in Fig. 20, to form a stuffing-box, for well-understood purposes. The short sections 293 have preferably also a stuffing-box connection 299 with said elbows and T's, such as shown clearly in Fig. 23.

Connected to elbow 291 by a knuckle-joint 300 is a pipe 301, which pipe 301 is, in turn, connected by a knuckle-joint 302 to a pipe 303, which is also, in turn, connected by a knuckle-joint 304 to a pipe 305 leading preferably to a source of hot water supply under pressure. As the knuckle-joints 300, 302, and 304 are similar in design and construction, the construction of knuckle-joint 300 will only be described here. As shown in Fig. 20, the elbow 291 is provided with an integral, outwardly-projecting tapered portion 306, this portion 306 being closed at its outer end and provided on its interior with a port 307 communicating with the bore of said tubular-member 288. Near its outer end said tapered portion 306 is provided with a series of perforations 308 communicating with said port 307. Pivotally mounted on the end of said tapered portion is a member 309 forming part of said knuckle-joint 300 and communicating with said pipe 301, said member 309 being provided with an annular groove 310 adapted to coöperate with said perforations 308, whereby communication is had with said port 307 and the bore of said tubular-member 288. The said tapered portion 306 is also provided on its outer end with a preferably integral projection 311 on which is mounted a coiled spring 312, said spring 312 being interposed between a washer 313 bearing against the outer end of said member 309 and suitable tension-adjusting nuts 314 on the end of said projection 311, whereby said member 309 of the knuckle-joint 300 is held in proper pivoted engagement with said tapered portion 306. Thus, the pipes 289 are adapted to move vertically with their respective sets of tubular-members 288 without breaking or disturbing communication with their respective water supplies, the pipes composed of said sections 302 and 303 and said knuckle-joints 300, 302, and 304 being sufficiently flexible to allow for the proper vertical movement of said tie-rods 195 and 195ª and the parts mounted thereon or carried thereby. It is obvious that said pipes 289 might be connected to their respective sources of water supply by rubber hose, but as rubber hose might wear too easily, we prefer to use the construction described. After the water from said respective sources of hot and cold water-supply has been properly used in cleaning the interior of the bottles, as more fully hereinafter appearing, it runs back into said respective troughs 243 and 243ª. The hot water in trough 243 is then led back to tank 3 through a pipe 316, while the cold water in trough 243ª finds escape to a sewer or other place of discharge through a pipe 317.

Supported on the end-frame 2 by bars 318 is a diaphragm 319 of any suitable material, preferably metal, reinforced on its edges by thickened portions 319ª, so as to be rigid and firm. On diaphragm 319 are mounted and properly positioned a plurality of pairs of upstanding ears 320, in which pairs of ears are pivotally mounted a plurality of levers, reading on Fig. 32 from left to right, A′, G′, D′, E′, B′, F′, C′, H′, and I′. Each of said levers is substantially channel-shaped, comprising a member 321 having at its ends right-angular extensions or arms 322; midway between said angular extensions or arms 322, said member 321 is provided with an eye 323, whereby said lever is adapted to have pivotal connection with its pair of said ears 320, each of said levers being arranged in its pair of supporting-ears 320 with the flat or straight edge of said member 321 facing or presented toward, and said arms 322 presented away from, said diaphragm 319, see particularly Fig. 33. Each of said arms 322 has rotatably mounted in its outer end an anti-friction roller 324 adapted to coöperate with said bar 234, for purposes shortly to appear.

Secured to the end-frame 2 in any suitable manner is a valve-chest 325 comprising a body portion 326, a cover-plate 327, and a bottom portion 328. In the chamber of said valve-chest are slidably arranged a plurality of slide-valves 329 of the common D-type, there being one slide valve for each of the said cylinders A, B, C, D, E, F, G, H, and I. Each of the said valves 329 is provided with a forwardly-extending stem 330 mounted in a stuffing-box 331 on the outside of said body portion 326 of said chest 325. It is also preferable to provide each of said slide-valves 329 with a long bearing, in order to reduce friction, and to this end, a short shaft 332 is provided on the rear face of each of said slide-valves 329, each shaft 332 being adapted to slide in a bushing 333 secured in the mouth of a dome-shaped member 334, which is, in turn, secured to the said body-portion 326 of said chest 325. Referring particularly to Fig. 36, it will be seen that each of said bushings 333 is provided with a plurality of grooves or channels 335 extending longitudinally therethrough, so as to provide a means of communication between said dome-shaped member 334 and the interior of said chest 325. It will be understood that there is a separate dome 334 for each of said valves 329. The several piston-rods working in their respective cylinders A, B, C, D, E, F, G, H, and I heretofore mentioned, are adapted to be driven or actuated preferably by fluid, preferably oil, under pressure, and as the chest 325 is constantly filled with this fluid under pressure, the said domes 334, having, as stated, communication with said chest, will also be constantly filled with said fluid; now, as the said short rods or shafts 332 reciprocate with their valves, a certain amount of this said fluid will be thereby displaced, this fluid flowing alternately in opposite directions through said grooves or channels 335. By the above construction, a long bearing for each of said slide-valves 329 is provided, and, at the same time, each of said bearings is maintained in a well lubricated condition. The said cover-plate 327 is provided with a threaded opening 327ª, in which is adapted to fit a pipe 336 leading from a suitable source of supply of a fluid, preferably oil, under pressure. A suitable valve 337 is provided in said pipe 336 to regulate the flow of said fluid into said chest 325. The base or bottom portion 328 of said valve-chest 325 is provided with a channel 328ª extending approximately centrally and longitudinally thereof, this channel being inclined downwardly at one end to empty into an exhaust-pipe 338. This said channel lies under all of said slide-valves 329 and provides an exhaust-port therefor. By referring particularly to Fig. 33, it will be seen that said bottom portion 328 of the valve-chest 325 is provided with a pair of ports 339 and 339ª for each slide valve and which ports are adapted to be covered and uncovered or opened and closed at proper predetermined intervals by the action of said slide-valves 329. Each of said pairs of ports 339 and 339ª is directly connected by pipe lines to one of said several cylinders A, B, C, D, E, F, G, H, and I, the left-hand pipe, referring now to Figs. 33 and 37, leading to the end of its cylinder through which the piston-rod working therein projects, and the right-hand pipe leading to the other or closed end of its said cylinder. In Fig. 37, we have identified each right-hand pipe by a small reference character indicating its proper cylinder, the left-hand pipes being also so identified, but with a prime mark added to their respective reference characters.

As heretofore described, we employ in our machine nine separate cylinders in which work nine separate piston-rods to perform various functions throughout the operation of our machine, and, reading from left to right on Fig. 37, these cylinders are as follows: A, the cylinder in which works the piston-rod 24 reciprocating bar 19 which carries the shaft or bar 21 and tappets 22, which tappets engage the bottles at the start of their travel and shift the same successively step by step between said rollers 9, 10, and 12; G, the cylinder in which works the piston-rod 158 for reciprocating said tie-rods 126 and 127 and the series of pairs of upper carrying-jaws 124 carried on said tie-rods; D, the cylinder in which works the piston-rod 109 for successively elevating through the means described, the bottles from said tank 3 to a position at the top of said elevator-shaft where the same may be successively gripped by said upper carrying jaws; E, the cylinder in which works the piston-rod 107 for changing, through the means described, the position of the bottles from a substantially horizontal position to a vertical position preparatory to their being elevated in said elevator-shaft; B, the cylinder in which works the piston-rod 37 adapted to cause said turn-table or basket 26 to successively transfer the bottles from between said rollers 9, 10, and 12, to between said rollers 38, 39, and 40; F, the cylinder in which works the piston-rod 153 which controls, through the means described, the opening and closing of said upper-carrying jaws 124; C, the cylinder in which works the piston-rod 42 adapted, through said reciprocating tappets 41, to shift the bottles successively between rollers 38, 39, and 40 and under said rotary brushes 43; H, the cylinder in which works the piston-rod 182, which controls, through the means described, the opening and closing of said lower holding jaws 175; and I, the cylinder in which works the piston-rod 235 which vertically reciprocates said tie-rods 195 and 195$^a$ and said vertically-acting rotating brushes 286 and 286$^a$ and associate parts. These cylinders are connected to the valve-chest 325 by, respectively, as before stated, pairs of pipe lines $a$—$a'$, $g$—$g'$, $d$—$d'$, $e$—$e'$, $b$—$b'$, $f$—$f'$, $c$—$c'$, $h$—$h'$, and $i$—$i'$, the slide-valve 329 coöperating, respectively, with each of said pairs of pipe lines being marked, respectively, see Fig. 34, $a''$, $g''$, $d''$, $e''$, $b''$, $f''$, $c''$, $h''$, and $i''$. The forwardly extending stem 330 of each of said slide-valves is pivotally connected by means of a connecting-rod 340 to its respective lever A', G', D', E', B', F', C', H', or I', pivotally mounted on said diaphragm 319, as hereinbefore described. The lower arm or extension 322 of each of said levers A', G', D', E', B', F', C', H', and I', except said levers G' and I', which levers G' and I' operate or reciprocate, respectively, the pistons in said cylinders G and I, is broken with a rule-joint 341, which will allow the outer portions of said arms 322 carrying said anti-friction rollers 324 to drop downwardly from a horizontal position, but which will prevent the same from being raised upwardly beyond a horizontal position, the said roller-carrying ends of said lower arms 322 being held normally in such horizontal position by means of coiled springs 342 connecting the same to their respective levers, as shown clearly in Figs. 33 and 35. From the foregoing, it will be seen that as the bar 234 moves upwardly, the lower ends of each of said levers will, at the proper time, be depressed, whereby the respective slide valves 329 connected thereto through the means stated will be pushed rearwardly, so as to admit the said fluid medium under pressure to escape through each of said right-hand pipes $a$, $g$, $d$, $e$, $b$, $f$, $c$, $h$, and $i$ into the closed end of its respective cylinder, whereby the respective piston-rods working therein are caused to move to perform the certain functions hereinbefore stated in their proper operative order. As said bar 234 continues to move upwardly under the action of its operating piston-rod 235, the upper ends of levers G' and H' will be depressed, whereby said fluid medium under pressure is admitted through said pipes $g'$ and $h'$ into the opposite ends of their respective cylinders G and H, causing the said piston-rods 158 and 182 working, respectively, therein, to be reversely reciprocated at the proper time to perform their respective prescribed functions. The last half of the continued upward travel of said bar 234 under the action of its said operating piston-rod 235, by depressing the upper ends of said levers B', F', E', D', C', A', and I', effects a return of the lower ends thereof to their original position, thereby pulling the respective slide-valves 329 operated thereby rearwardly, so as to admit said fluid medium under pressure into the other ends of the respective cylinders, whereby the said several respective piston-rods working in said cylinders will be reversely reciprocated at the proper time to perform their respective prescribed functions. It will be noted, see particularly Fig. 32, that the upper end of lever I' is one of the last to be depressed, and as this lever is the one which controls the reciprocation of piston-rod 235 working in cylinder I and thus controls the movement of said bar 234, see Fig. 1, said bar, upon depressing said upper end of lever I', will be automatically caused to descend or travel downwardly, as the depression of the upper end of lever I' has caused its slide-valve $i''$ to move to admit pressure into the opposite end of cylinder I, which pressure forces said piston-rod 235 downwardly, carrying therewith said bar 234. As the bar 234 descends, the upper ends of all of said levers having been depressed on the upward travel of said bar 234, the bar 234 will ride therepast; but the lower ends of said levers are now standing in the path of said descending bar. However, as the lower ends of all said levers, except levers G' and I', are provided with said rule-joints 341, these ends of said levers will be broken by said bar as the same passes downwardly, so that their respective valves will thus not be operated on the downward travel of said bar 234. The lower ends of said levers G' and I', which are not provided with said rule-joints 341, will, however, be again depressed on the downward travel of said bar 234, and thus said piston-rod 158 will be again moved rearwardly, and said piston-rod 235 will be again moved upwardly to reverse the direction of travel of said bar 234. Thus, the several slide-valves 329 are automatically operated to reciprocate the several respective piston-rods having connection therewith, the reciprocation of each piston-rod being so timed and regulated that the prescribed function of each will be performed at the proper time or in proper order throughout the operation of the machine.

From the foregoing description, the operation of our machine may be briefly described, as follows: The drive-shaft 78, being provided on its outer end with suitable pulleys 343, is adapted to be suitably connected with any suitable source of power and to be rotated thereby, whereby, through the gearing with said shaft 78 heretofore described, the rollers 9, 10, and 12, and 38, 39, and 40, and said rotary brushes 43 will be rotated, as will also the shaft 192 and said master-gear 213$^a$, and through said master-gear said train of gear-wheels 205 and 213 will be rotated to rotate said vertically-acting brushes 286 and 286$^a$. As we have before mentioned, the bottles $x$ are successively passed through chute 4 on to said basket 6 with their necks or heads presented rearwardly facing the said rollers 9, 10, and 12. As shown in Fig. 1, the tie-rods 195 and 195$^a$, which carry, as described, the vertically-acting brushes 286 and 286$^a$, are in their lowermost position. The said bar 234 now contacts with, see also Fig. 32, and depresses the lower ends of levers G' and I', allowing said fluid under pressure to enter said cylinders G and I, whereupon said tie-rods 126 and 127 carrying said upper-carrying jaws 124 are reciprocated rearwardly and said tie-rods 195 and 195$^a$ carrying, as described, said vertically-acting brushes 286 and 286$^a$ and said bar 234 begin to move upwardly; and during this upward travel of said bar 234, the lower ends of levers A', E', and H' are first depressed, allowing said fluid under pressure to flow into said cylinders A, E, and H, to, respectively, through the means described, reciprocate forwardly the said tappets 22 to perform their prescribed function, raise said basket 86 from a substantially horizontal to a vertical position to deliver the bottles successively, as described, into said elevator-shaft 87, and to rock said rock-shafts 162 and their carried jaws 175 together to grasp the bottles. Next, the lower ends of levers B' and C' are depressed, allowing said fluid under pressure to enter said cylinders B and C to, respectively, through the means described, cause said turn-table basket 26 to travel transversely across tank 3 to, as described, carry the bottles $x$ successively from said rollers 9, 10, and 12, to said rollers 38, 39, and 40, and to reciprocate forwardly said tappets 41 to shift said bottles between said rollers 38, 39, and 40 and under said rotary brushes 43. Next, the lower end of lever F' is depressed, allowing said fluid under pressure to enter cylinder F to, through the means described, open said upper-carrying jaws 124. Then, next, the lower end of lever D' is depressed, allowing said fluid under pressure to flow into cylinder D to elevate the bottles, as described, successively to the top of said elevator-shaft 87. Then, in the continued upward travel of said bar 234, the upper ends of levers G', H', B', F', E', D', and C' are, in turn, depressed, allowing said fluid under pressure to flow into the opposite ends of each of said respective cylinders to reversely reciprocate the piston-rod working in each thereof to perform the several respective functions of each thereof hereinbefore stated. When the bar 234 has reached the uppermost limit of its travel, the upper end of levers A' and I' are depressed, allowing said fluid under pressure to flow into the opposite ends of cylinders A and I, thereby, respectively, causing, through the means described, said tappets 22 to be reversely reciprocated, and said bar 234 to now travel downwardly. During this downward travel of said bar 234, none of the said levers will, as before stated, be operated, but when said bar 234 has reached the lowermost limit of its travel, the lower ends of levers G' and I' will be depressed, thereby causing, through the means described, said tie-rods 126 and 127 and their carried upper-carrying jaws 124 to be again reciprocated rearwardly, and said bar 234 to now begin to again travel upwardly, and so on throughout the operation of our machine, each of said levers being so positioned on said diaphragm and being each of such a length that the bar 234 will contact with and depress the respective ends thereof at the proper time to reciprocate the said several respective piston-rods to perform their several prescribed functions in their proper order. Thus the bottles $x$ are caused to travel first rearwardly through said tank of hot water between said rollers 9, 10, and 12 and to be, at the same time, rotated in said hot water by said rollers 9 and 10; then from said rollers 9, 10, and 12, the bottles are successively delivered by said turn-table-basket 26 to said rollers 38, 39, and 40, by which rollers 38 and 39 the bottles continue to be rotated and between which rollers 38, 39, and 40 the bottles are now caused to travel successively forwardly through said tank of hot water, at the same time being subjected to the action of said rotary brushes 43, and from said rollers 38, 39, and 40 the bottles are now successively delivered or shifted into said basket 83. Thus, while traveling through said tank, it will be seen that the bottles are given a thorough washing and also a thorough exterior cleaning by said brushes 43, all labels, rust, or other foreign matter on the exterior thereof being completely removed. It might be added here that preferably a constant circulation of hot water is maintained in said tank 3, said tank communicating preferably at its forward end through a pipe 344 with any suitable source of hot water supply, while an exhaust-pipe 345 leads preferably from the rearward end of said tank back to said hot-water supply. The hot water is thus not wasted, but may be used over and over again. A suitable wire screen or gauze 346 preferably covers the opening into said exhaust-pipe 345, preventing said exhaust-pipe from becoming choked by labels, paper, or other matter removed from said bottles and carried in the water in said tank. From said basket 83, the bottles $x$ are then successively shifted into said basket 86, then by said basket 86 successively delivered into said elevator-shaft 87, then by the means described successively raised to the top of said elevator-shaft in position to be successively grasped by said upper-carrying jaws 124, and then by said reciprocating series of upper-carrying-jaws 124 successively carried through said series of lower holding-jaws 175, and finally delivered, thoroughly washed and cleaned, both interiorly and exteriorly, into said discharge-chute 183, each of said bottles being held, in turn, by each pair of lower holding-jaws 175 a sufficient length of time to receive therein and be subjected interiorly to the action of said vertically-acting brushes 286 and 286$^a$. Now, during the upward travel of said bar 234, said tie-bars 195 and 195$^a$ and their carried parts are likewise traveling upwardly, said tie-bars being, as before described, slidably mounted on said post 35 and shaft 192, the tubular-members 274 and their bushings 278 contacting, at the proper time, against the mouths of said bottles $x$ while said bottles, as described, are being held in said lower holding-jaws 175. Now, during the said upward travel of said tie-bars 195 and 195$^a$, it will be seen that the said eye-bolts 251 are carried upwardly away from said stop-nuts 253, so that, when said tubular-members 274 and said bushings 278 contact with the mouths of said bottles, the coiled springs 265 are allowed to play to take up any shock or jar as said tubular-members 274 and bushings 278 come into contact with said bottles and at the same time hold said tubular-members 274 and bushings 278 in proper position in contact with the mouths of said bottles, the said bottles preventing any further upward movement of said tubular-members 274 and bushings 278 in the continued upward travel of said tie-bars 195 and 195$^a$. Then, as said tie-bars 195 and 195$^a$ continue to travel upwardly, the said hollow shafts 246 continue to move upwardly through said tubular-members 274, said brush-carrying members 280 and said brushes 286 and 286$^a$ being gradually forced out of said bushings 278 into the interior of the said bottles, and, as soon as said brush-sockets 285 and 285$^a$ have been forced upwardly out of their respective bushings 278, said plungers 282 are forced upwardly under the tension of said coiled springs 284, thereby diagonally spreading or tilting, respectively, said brushes 286 and 286$^a$ to clean the entire interior surface of the said bottles, as before described, and at the same time opening communication between said ports 281 and the bore of said hollow shafts 246, whereupon water from said respective sources of hot and cold water under pressure will be sprayed upon the interior surface of the said bottles, it being remembered that the said brushes are being, as before described, constantly rotated. Thus, the entire inner surface of each bottle is thoroughly washed and cleaned and is also rinsed by said cold water, as before described, this water from the interior of the bottles afterward escaping therefrom through suitable vertically-disposed slots 347 in the upper end of each of said tubular-members 274 into said respective troughs 243 and 243$^a$. On the downward travel of said tie-bars 195 and 195$^a$, said brush-carrying members 280 and their carried brushes 286 and 286$^a$ will be first withdrawn from within said bottles to within their respective bushings 278, and then, as said eye-bolts 251 contact with said stop-nuts 253, said tubular-members 274 and bushings 278 will be likewise carried downward with said tie-bars 195, and 195ª, and so on throughout the operation of the machine. It will be obvious that, should a tubular-member 274 not come into contact with a bottle, as described, in the upward travel of said tie-bars 195 and 195ª, in other words, should any of said pairs of lower holding-jaws 175 not be holding a bottle, then the said tubular-member 274 will continue to travel upwardly with said tie-bars to the uppermost limit of their travel, and thus said brushes will not be released and water from said sources of supply under pressure will not be sprayed over the machine. Should said brushes or their carrying-members or associate parts become worn, or should it be desired to replace the same for any reason, the spring-pressed pins 272 may be released from engagement with said rods 255, whereupon said yoke-member 267 may be horizontally turned and said member 274 and its bushing 278 moved downwardly on said hollow-shaft 246, when access to said brushes or their associate parts may be readily had, the said tubular-member 274 and its bushing 278 being afterward returned to proper position and said yoke member again engaged with said rods. It will be noticed, see particularly Figs. 24 and 25, that said cut-out portions 271 are, as it might be said, on diagonally opposite sides of said yoke-member 267. As the rotation of the hollow shaft 246 will frictionally tend to rotate the tubular-member 274 and the yoke-member 267, and as said yoke-member 267 is not adapted to be rotated, the resulting strain is thrown directly upon said laterally-extending portions 268 of said yoke-member 267 and not upon said pins 272.

The said cylinders A, B, C, D, E, F, G, H, and I are of any approved construction, and as the same are all practically similar, but of different dimensions adapted to suit the individual requirements thereof, we have shown in detail but one cylinder—cylinder G— see Fig. 19.

In our machine, through the adjustability of the several parts, as described, bottles of varying sizes and diameters may be readily accommodated. It will also be seen that the bottles are not liable to damage or breakage and are thoroughly cleaned, both interiorly and exteriorly, in a very short space of time, and that during the operation of our machine the services of but one workman or operator is required to feed the bottles into chute 4.

While we have herein shown and described fluid-controlled or actuated means for operating the several parts of our machine, yet it is to be understood that said parts might also and equally well be operated by other means, and we are also aware that other changes in the construction, combination, and arrangement of the several parts of our machine might be made and substituted for those herein shown and described without departing from the nature or spirit of our invention.

Having thus described our invention, what we claim and desire to secure by Letters Patent is:

1. In a bottle cleaning machine, a tank adapted to contain water, a pair of elongated parallel rollers mounted in said tank adapted to lengthwise rotatably support a bottle and upon which said bottle is caused to travel endwise in said tank, means adapted to rotate said rollers, means adapted to cause said bottle to travel endwise on said rollers in said tank, a hingedly mounted rotary brush to one side of said rollers and having its axis parallel with the axes of said rollers, said brush being adapted to clean the exterior of said bottle while on said rollers and to be engaged and swingably moved by said bottle to accommodate the same as said bottle is caused to travel endwise on said rollers therebeneath, and means adapted to rotate said brush; substantially as described.

2. A bottle-cleaning machine comprising a tank adapted to contain water, rollers mounted in said tank adapted to rotatably support a bottle, means adapted to rotate said rollers, a plurality of rotatable brushes adapted to clean the exterior of said bottle while on said rollers, a flexible connection between said brushes, and means adapted to rotate said brushes; substantially as described.

3. A bottle-cleaning machine comprising a tank adapted to contain water, rollers mounted in said tank adapted to rotatably support a bottle and upon which said bottle is caused to travel in said tank, means adapted to rotate said rollers, means adapted to cause said bottle to travel on said rollers in said tank, a plurality of pivotally mounted flexibly connected rotatable brushes adapted to clean the exterior of said bottle while on said rollers and to be independently swingingly moved by said bottle while on said rollers, and means adapted to rotate said brushes; substantially as described.

4. In a bottle-cleaning machine, the combination with a tank adapted to contain water, of a pair of elongated parallel rollers in said tank, said rollers being adapted to lengthwise support a bottle and upon which said bottle is caused to travel endwise in said tank, means adapted to shiftingly cause said bottle to travel endwise in said tank on said rollers, and an alining series of hinged independently movable spring-pressed rollers arranged above and extending longitudinally with said bottle-supporting rollers, said hinged rollers being adapted to yieldingly hold said bottle in frictional engagement with said bottle-supporting rollers as the same is caused to shiftingly travel endwise therealong: substantially as described.

5. In a bottle-cleaning machine, the combination with a tank adapted to contain water, of a pair of elongated parallel rollers in said tank, said rollers being adapted to lengthwise support a bottle and upon which said bottle is caused to travel endwise in said tank, means adapted to shiftingly cause said bottle to travel endwise in said tank on said rollers, an alining series of hinged independently movable spring-pressed rollers arranged above and extending longitudinally with said bottle-supporting rollers, said hinged rollers being adapted to yieldingly hold said bottle in frictional engagement with said bottle-supporting rollers as the same is caused to shiftingly travel endwise therealong, and a rotary brush adapted to clean the exterior of said bottle while traveling on said bottle-supporting rollers; substantially as described.

6. A bottle-cleaning machine comprising a tank adapted to contain water, a set of rollers mounted in said tank adapted to rotatably support bottles and upon which said bottles are caused to travel rearwardly through said tank, means adapted to cause said bottles to travel rearwardly on said rollers, a second set of rollers mounted in said tank adapted to rotatably support bottles and upon which said bottles are caused to travel forwardly in said tank, means adapted to cause said bottles to travel forwardly on said second set of rollers, and means adapted to successively transfer said bottles from said first set of rollers to said second set of rollers; substantially as described.

7. A bottle-cleaning machine comprising a tank adapted to contain water, a set of rollers mounted in said tank adapted to rotatably support bottles and upon which said bottles are caused to travel rearwardly through said tank, means adapted to cause said bottles to travel rearwardly on said rollers, a second set of rollers mounted in said tank adapted to rotatably support bottles and upon which said bottles are caused to travel forwardly in said tank, means adapted to cause said bottles to travel forwardly on said second set of rollers, means adapted to successively transfer said bottles from said first set of rollers to said second set of rollers, means adapted to rotate said sets of rollers, and means adapted to clean the exterior of said bottles while on said rollers; substantially as described.

8. A bottle-cleaning machine comprising a tank adapted to contain water, a set of horizontally-disposed rollers mounted in said tank adapted to rotatably support bottles and upon which said bottles are caused to travel rearwardly in said tank, means adapted to cause said bottles to travel rearwardly on said rollers, a second set of horizontally-disposed rollers mounted in said tank adapted to rotatably support bottles and upon which said bottles are caused to travel forwardly in said tank, means adapted to cause said bottles to travel forwardly on said rollers, means adapted to yieldingly hold said bottles in frictional engagement with each of said sets of rollers, means adapted to rotate said sets of rollers, a turn-table movably mounted in said tank adapted to successively transfer said bottles from said first set of rollers to said second set of rollers, means adapted to operate said turn-table, rotatably mounted brushes adapted to successively clean the exterior of said bottles while on said rollers, and means adapted to rotate said brushes; substantially as described.

9. A bottle-cleaning machine comprising means adapted to releasably grip a bottle, reciprocatory means adapted to successively carry bottles to and remove the same from said gripping-means, mechanism adapted to reciprocate said reciprocatory-means, and means adapted to clean the interior of said bottles while held in said gripping-means; substantially as described.

10. A bottle-cleaning machine comprising means adapted to releasably grip a bottle, reciprocatory-means adapted to successively carry bottles to and remove the same from said gripping-means, mechanism adapted to reciprocate said reciprocatory means, a brush adapted to clean the interior of said bottles, and mechanism adapted to reciprocate said brush into and out of the interior of a bottle while the same is held in said gripping-means; substantially as described.

11. A bottle-cleaning machine comprising means adapted to releasably grip a bottle, reciprocatory means adapted to successively carry bottles to and remove the same from said gripping-means, mechanism adapted to reciprocate said reciprocatory means, a vertically-reciprocatory rotatable brush adapted to clean the interior of said bottles, mechanism adapted to reciprocate said brush into and out of a bottle while the same is held in said gripping-means, and means adapted to rotate said brush; substantially as described.

12. A bottle-cleaning machine comprising a pair of holding-jaws adapted to releasably grip a bottle, a pair of carrying-jaws adapted to successively carry bottles to said holding-jaws, a second pair of carrying-jaws adapted to successively remove said bottles from said holding-jaws, and means adapted to clean the interior of said bottles while held by said holding-jaws; substantially as described.

13. A bottle-cleaning machine comprising a pair of holding-jaws adapted to open and close to alternately grip and release a bottle, means adapted to open and close said jaws, reciprocatory pairs of carrying-jaws adapted to successively carry bottles to and remove the same from said holding-jaws, means adapted to reciprocate said carrying-jaws, a vertically-reciprocatory rotatable brush adapted to clean the interior of said bottles, means adapted to reciprocate said brush into and out of a bottle while the same is held by said holding-jaws, and means adapted to rotate said brush; substantially as described.

14. A bottle-cleaning machine comprising a series of pairs of holding-jaws adapted to open and close to alternately grip and release a bottle, means adapted to open and close said jaws, a reciprocatory series of pairs of carrying-jaws adapted to open and close and to carry a bottle successively through said series of holding-jaws, means adapted to reciprocate said carrying-jaws, means adapted to open and close said carrying-jaws, a series of vertically-reciprocatory rotatable brushes adapted to clean the interior of said bottle, each of said brushes being adapted to be successively reciprocated into and out of said bottle while the same is being successively held by said holding-jaws, means adapted to rotate said series of brushes, and means adapted to reciprocate said series of brushes; substantially as described.

15. In a bottle cleaning machine, means adapted to hold a bottle, a member having a vertically-disposed bore in proper vertical alinement with said bottle-holding means, a reciprocatory rotatable tubular member slidable in said first-named member and communicating with a source of water supply under pressure, a brush mounted on said rotatable tubular member, said brush, when said rotatable tubular member is in lowered position, lying within said first-named member, means adapted to rotate said tubular member and its carried brush, means adapted to reciprocate said rotatable tubular member to alternately carry said brush out of and into said first-named member and into and out of said bottle, and means slidably movable in, and parallel with, the bore of said rotatable tubular member adapted to open communication between the interior of said tubular member and the interior of said bottle when said brush is within said bottle; substantially as described.

16. In a bottle cleaning machine, means adapted to hold a bottle, a member having a vertically-disposed bore in proper vertical alinement with said bottle-holding means, a reciprocatory rotatable tubular member slidable in said first-named tubular member and communicating with a source of water supply under pressure and having outlet-ports, a brush mounted on said rotatable tubular member, said brush when said rotatable tubular member is in lowered position, lying within said first-named member, means adapted to rotate said tubular member and its carried brush, means adapted to reciprocate said rotatable tubular member to alternately carry said brush out of and into said first-named member and into and out of said bottle, and means slidably movable in, and parallel with, the bore of said rotatable tubular member adapted to close said outlet-ports when said tubular member is in lowered position and to open said outlet-ports when said tubular member is in raised position and said brush is within said bottle; substantially as described.

17. In a bottle cleaning machine, means adapted to hold a bottle, a member having a vertically-disposed bore in proper vertical alinement with said bottle-holding means, a reciprocatory rotatable tubular member slidable in said first-named member and communicating with a source of water supply under pressure and having outlet ports, a brush mounted on said rotatable tubular member, said brush, when said rotatable tubular member is in lowered position, lying within said first-named member, means adapted to rotate said tubular member and its carried brush, means adapted to reciprocate said rotatable tubular member to alternately carry said brush out of and into said first-named member and into and out of said bottle, and a spring-actuated plunger slidable in, and parallel with, the bore of said rotatable tubular member, said plunger being adapted to close said outlet ports when said tubular member is in lowered position and to open said outlet-ports to allow water from said tubular member to spray the interior of said bottle when said tubular member is in raised position and said brush is within the bottle; substantially as described.

18. A bottle-cleaning machine comprising a pair of jaws adapted to releasably support a bottle, a casting mounted in vertical alinement with said jaws, a tubular-member slidably arranged in said casting, a rotatable hollow shaft slidable in said tubular-member and communicating with a source of water-supply under pressure, a brush carried on the upper end of said shaft and normally lying within said tubular-member, vertically-reciprocatory means upon which said shaft is mounted, means adapted to rotate said shaft and its carried brush, means adapted to vertically reciprocate said reciprocatory means, whereby said brush is reciprocated into and out of said bottle while held by said jaws, yielding-means adapted to vertically raise said tubular-member into resilient contact with the mouth of said bottle on the upward movement of said reciprocatory means, means adapted to vertically lower said tubular-member out of contact with said bottle on the downward movement of said reciprocatory means, and means adapted to open communication between the bore of said shaft and the interior of said bottle when said brush is in said bottle; substantially as described.

19. A bottle-cleaning machine comprising a pair of jaws adapted to releasably support a bottle, a casting mounted in vertical alinement with said jaws, a tubular-member slidably arranged in said casting, a rotatable hollow shaft slidable in said tubular-member and communicating with a source of water-supply under pressure and having outlet-ports, a brush carried on the upper end of said shaft and normally lying within said tubular-member, a pair of vertically-reciprocatory tie-rods on which said shaft is mounted, a gear-wheel mounted on said tie-rods and fixed to said shaft, means adapted to rotate said gear-wheel, means adapted to vertically reciprocate said tie-rods, whereby said brush is reciprocated into and out of said bottle, resiliently-actuated means adapted to vertically raise said tubular-member into resilient contact with the mouth of said bottle on the upward movement of said tie-rods, means adapted to vertically lower said tubular-member out of contact with the mouth of said bottle on the downward movement of said tie-rods, and means adapted to close said ports when said brush is in lowered position and to open said ports when said brush is in raised position within the bottle, substantially as described.

20. A bottle-cleaning machine comprising a plurality of pairs of holding-jaws, each pair of said jaws being adapted to releasably hold a bottle, a pair of vertically-movable tie-rods, a plurality of brush-supporting castings mounted on said tie-rods, a plurality of rotatable shafts carried by said castings, each of said shafts being in operative vertical alinement with a pair of said holding-jaws, brushes carried by said shafts, means adapted to rotate said shafts and their carried brushes, and means adapted to vertically reciprocate said tie-rods, whereby said brushes are alternately reciprocated into and out of said bottles; substantially as described.

21. A bottle-cleaning machine comprising a plurality of pairs of holding-jaws, each pair of said jaws being adapted to releasably hold a bottle, a plurality of pairs of carrying-jaws adapted to successively carry bottles to, and remove the same from, said holding-jaws, a pair of vertically-reciprocatory tie-rods, a plurality of brush-supporting castings mounted on said tie-rods, a plurality of rotatable shafts carried by said castings, each of said shafts being in operative vertical alinement with a pair of said holding-jaws, brushes carried by said shafts, a train of gearing mounted on said castings adapted to rotate said shafts and their carried brushes, means adapted to rotate said train of gearing, and means adapted to vertically-reciprocate said tie-rods, whereby said brushes are alternately reciprocated into and out of said brushes; substantially as described.

22. A bottle-cleaning machine comprising a plurality of pairs of holding-jaws, each pair of said jaws being adapted to releasably hold a bottle, a pair of vertically-reciprocatory tie-rods, a plurality of brush-supporting castings on said tie-rods, a plurality of rotatable shafts carried by said castings, each of said shafts being arranged in operative vertical alinement with a pair of said jaws, a plurality of tubular-members arranged in operative vertical alinement with said holding-jaws and adapted to slidably support the upper ends of said shafts, brushes mounted on said shafts and normally lying within said shaft-supporting-tubular-members, means adapted to rotate said shafts and their carried brushes, and means adapted to vertically reciprocate said tie-rods, whereby said brushes are adapted to be alternately reciprocated into and out of said bottles; substantially as described.

23. A bottle-cleaning machine comprising a plurality of pairs of holding-jaws, each of said pairs of jaws being adapted to releasably hold a bottle, a pair of vertically-reciprocatory tie-rods, a plurality of brush-supporting castings mounted on said tie-rods, a plurality of rotatable shafts carried by said castings, each of said shafts being arranged in operative vertical alinement with a pair of said jaws, a plurality of tubular-members slidably arranged in vertical alinement with said holding-jaws, each of said tubular members being adapted to slidably support the upper end of one of said shafts, brushes carried by said shafts and normally lying within said shaft-supporting-tubular-members, means adapted to rotate said shafts and their carried brushes, means adapted to vertically reciprocate said tie-rods, whereby said brushes are adapted to be alternately reciprocated into and out of said bottles, resiliently-actuated means adapted to upwardly move said tubular-members on the upward movement of said tie-rods into yielding contact with the mouths of said bottles, and means adapted to downwardly move said tubular-members out of contact with the mouths of said bottles on the downward movement of said tie-rods; substantially as described.

24. A bottle-cleaning machine comprising a plurality of pairs of holding-jaws, each pair of said jaws being adapted to releasably hold a bottle, a pair of vertically-reciprocatory tie-rods, a plurality of brush-supporting castings mounted on said tie-rods, a plurality of rotatable hollow shafts carried by said castings, each of said shafts being arranged in operative vertical alinement with a pair of said jaws and communicating with a source of water-supply under pressure, a plurality of tubular-members slidably arranged in vertical alinement with said holding-jaws, each of said tubular-members being adapted to slidably support the upper end of one of said shafts, brushes carried by said shafts and adapted to normally lie within said shaft-supporting-tubular-members, means adapted to rotate said shafts and their carried brushes, means adapted to vertically reciprocate said tie-rods, whereby said brushes are adapted to be alternately reciprocated into and out of said bottles, resiliently-actuated means adapted to upwardly move said tubular-members into yielding contact with the mouths of said bottles on the upward movement of said tie-rods, means adapted to downwardly move said tubular-members out of contact with the mouths of said bottles on the downward movement of said tie-rods, and means adapted to open communication between the bores of said shafts and the interior of said bottles when said brushes are within said bottles; substantially as described.

25. In a bottle-cleaning machine, the combination with end-frames, of a pair of tie-rods stationarily mounted on said end-frames, a plurality of pairs of holding-jaws mounted on said tie-rods, each of said pairs of jaws being adapted to releasably hold a bottle, a second pair of tie-rods mounted on said end-frames, a plurality of perforated castings mounted on said second pair of tie-rods in vertical coöperative alinement with said pairs of holding-jaws, a plurality of pairs of vertically-disposed rods movably arranged on said castings, a plurality of yoke-members engaging said pairs of vertically-disposed rods, tubular-members slidably arranged in said perforated castings and supported by said yoke-members, a pair of vertically-movable tie-rods, a plurality of brush-supporting castings mounted on said vertically-movable tie-rods, a plurality of rotatable shafts mounted on said last-named castings and slidably fitting in said tubular-members, brushes carried by said shafts and adapted to be normally within said shaft-supporting-tubular-members, means adapted to rotate said shafts and their carried brushes, means adapted to vertically reciprocate said vertically-movable tie-rods, whereby said brushes are adapted to be alternately reciprocated into and out of said bottles, resiliently-actuated means adapted to upwardly move said yoke-members and their carried tubular-members on the upward movement of said vertically-movable tie-rods, and means on said last-named castings loosely engaging said vertically-disposed rods adapted to downwardly move said yoke-members and their carried tubular-members on the downward movement of said vertically-movable tie-rods; substantially as described.

26. In a bottle-cleaning machine, the combination with end-frames, of a pair of tie-rods stationarily mounted on said end-frames, a plurality of pairs of holding-jaws mounted on said tie-rods, each of said pairs of jaws being adapted to releasably hold a bottle, a second pair of tie-rods stationarily mounted on said end-frames, a plurality of perforated castings mounted on said second pair of tie-rods in vertical coöperative alinement with said pairs of holding-jaws, tubular-members slidably arranged in said castings, a pair of vertically-movable tie-rods, a plurality of brush-supporting castings mounted on said vertically-movable tie-rods, a plurality of rotatable hollow shafts carried by said castings and communicating with a source of water-supply under pressure and having outlet-ports, each of said shafts being arranged in vertical coöperative alinement with a pair of said holding-jaws and the upper ends of said shafts being slidably supported in said tubular-members, brushes carried by said shafts and adapted to be normally within said shaft-supporting-tubular-members, a train of gearing mounted on said last-named castings adapted to rotate said shafts and their carried brushes, means adapted to rotate said train of gearing, means adapted to vertically reciprocate said vertically-movable tie-rods, whereby said brushes are adapted to be alternately reciprocated into and out of said bottles, resiliently-actuated means adapted to upwardly move said tubular-members into yielding contact with the mouths of said bottles on the upward movement of said brushes, means adapted to downwardly move said tubular-members out of contact with the mouths of said bottles on the downward movement of said brushes, and spring-actuated plungers in said shafts adapted to close said ports when said brushes are within said tubular-members and to open said ports when said brushes are within said bottles, whereby the interior of said bottles is sprayed with water from said source of supply when said brushes are within the bottles; substantially as described.

27. A bottle-cleaning machine comprising means adapted to hold a bottle in a vertically-disposed position, a vertically-reciprocatory tubular-member in operative alinement with said bottle-holding means and having outlet-ports, said member communicating with a source of water-supply, and means slidably-movable in said member adapted to close said ports when said member is in lowered position and to open said ports when said member is in raised position; substantially as described.

28. A bottle-cleaning machine comprising means adapted to hold a bottle in a vertically-disposed position, a reciprocatory tubular-member in operative alinement with said bottle-holding means and communicating with a source of water-supply under pressure, said tubular-member being provided with outlet-ports, means adapted to reciprocate said tubular-member to carry the same into and out of said bottle, and a spring-actuated plunger slidably-movable in said tubular-member adapted to close said outlet-ports when said tubular-member is in lowered position and to open said outlet-ports when said tubular-member is in raised position and within said bottle; substantially as described.

29. A bottle-cleaning machine comprising means adapted to hold a bottle in a vertically-disposed position, a tubular-member arranged in proper vertical alinement with said bottle-holding means, a reciprocatory tubular-member slidable in said first-named tubular-member and communicating with a source of water-supply, a hollow member mounted on said reciprocatory tubular-member and normally lying within said first-named tubular-member, said hollow member being provided with outlet-ports and having its bore in communication with the bore of said reciprocatory tubular-member, means adapted to reciprocate said reciprocatory tubular-member to carry said hollow member out of and into said first-named tubular-member and into and out of said bottle, and a spring-pressed plunger adapted to close said ports when said hollow member is in lowered position and to open said ports when said hollow member is carried out of said first-named tubular member into said bottle; substantially as described.

30. A bottle-cleaning machine comprising means adapted to hold a bottle in a vertically-disposed position, a vertically-reciprocatory hollow member in operative alinement with said bottle-holding means and having outlet-ports, means adapted to vertically reciprocate said member, a flexible connection between said member and a source of water-supply under pressure, and a spring-actuated plunger slidably-movable in said member adapted to close said ports when said member is in lowered position and to open said ports when said member is in raised position; substantially as described.

31. A bottle-cleaning machine comprising means adapted to hold a bottle in a vertically-disposed position, a vertically-reciprocatory hollow member in operative alinement with said bottle-holding means and having outlet-ports, means adapted to vertically reciprocate said member, a pipe communicating with a source of water-supply under pressure, an elbow on the lower end of said member, a stuffing-box connection between said tubular-member and said elbow, a knuckle-joint connection between said elbow and said pipe, and a spring-pressed plunger in said member adapted to close said ports when said member is in lowered position and to open said ports when said member is in raised position; substantially as described.

32. In a bottle-cleaning machine, the combination with means adapted to clean the interior of a bottle while in a vertically-disposed position, of a pair of holding-jaws adapted to releasably support a bottle in a vertically-disposed position in operative alinement with said bottle-cleaning means, each of said jaws comprising a supporting-casting, a lever rockingly mounted in said casting, and a bottle-grasping-member mounted on the end of said lever; substantially as described.

33. In a bottle-cleaning machine, the combination with means adapted to clean the interior of a bottle while in a vertically-disposed position, of a pair of holding-jaws adapted to releasably support a bottle in a vertically-disposed position in operative alinement with said bottle-cleaning means, each of said jaws comprising a supporting-casting, a lever rockingly mounted in said casting, a block pivotally connected to the upper end of said lever, a movable cylinder within which said block is mounted, and a bottle-grasping-member mounted on the inner end of said cylinder; substantially as described.

34. In a bottle-cleaning machine, the combination with means adapted to clean the interior of a bottle while in a vertically-disposed position, of a pair of holding-jaws adapted to releasably support a bottle in a vertically-disposed position in operative alinement with said bottle-cleaning means, each of said jaws comprising a supporting-casting, a lever rockingly mounted in said casting, a block pivotally connected to the upper end of said lever, a movable cylinder within which said block is mounted, a bottle-grasping-member pivotally mounted on the inner end of said cylinder, and means adapted to hold said bottle-grasping-member in a vertically-disposed position relative to said bottle; substantially as described.

35. In a bottle-cleaning machine, the combination with means adapted to clean the interior of a bottle while in a vertically-disposed position, of a pair of holding-jaws adapted to releasably support a bottle in a vertically-disposed position in operative alinement with said bottle-cleaning-means, each of said jaws comprising a supporting-casting, a lever rockingly mounted in said casting, a block pivotally connected to the upper end of said lever, a movable cylinder within which said block is mounted, a bottle-grasping-member pivotally mounted on the inner end of said cylinder, horizontally-disposed stems on said bottle-grasping member, and brackets on said casting in which said stems are adapted to slide, whereby said bottle-grasping-member is held in a vertically-disposed position relative to said bottle; substantially as described.

36. In a bottle-cleaning machine, the combination with means adapted to clean the interior of a bottle while in a vertically-disposed position, of a pair of holding-jaws adapted to interchangeably support bottles of varying diameters in a vertically-disposed position in operative alinement with said bottle-cleaning means, said pair of jaws comprising a pair of supporting-castings, a lever rockingly mounted in each of said castings, and coöperating bottle-grasping-members resiliently arranged on the ends of said levers; substantially as described.

37. In a bottle-cleaning machine, the combination with means adapted to clean the interior of a bottle while in a vertically-disposed position, of a pair of holding-jaws adapted to yieldingly support a bottle in a vertically-disposed position in operative alinement with said bottle-cleaning-means, each of said jaws comprising a supporting-casting, a bell-crank lever rockingly mounted in said casting, a block pivotally connected to the upper end of said lever, a movable cylinder within which said block is slidingly arranged, a bottle-grasping-member mounted on the inner end of said cylinder, and a coiled spring in said cylinder against which said block is adapted to bear; substantially as described.

38. In a bottle-cleaning machine, the combination with means adapted to clean the interior of a bottle while in a vertically-disposed position, of means adapted to releasably hold a bottle in a vertically-disposed position in operative vertical alinement with said cleaning-means, a pair of carrying-jaws adapted to carry a bottle to said supporting-means, and a pair of jaws adapted to remove said bottle from said supporting-means, each pair of said jaws comprising a casting, a pair of levers pivotally mounted on said casting, and coöperating bottle-grasping-members carried on the lower ends of said levers; substantially as described.

39. In a bottle-cleaning machine, the combination with means adapted to clean the interior of a bottle while in a vertically-disposed position, of means adapted to releasably hold a bottle in a vertically-disposed position in operative vertical alinement with said cleaning-means, a pair of carrying-jaws adapted to carry a bottle to said supporting-means, and a pair of jaws adapted to remove said bottle from said supporting-means, each pair of said jaws comprising a casting, a pair of levers pivotally mounted on said casting, a horizontally-disposed arm carried on the lower end of each of said levers, and coöperating bottle-grasping-members mounted on the inner ends of said arms; substantially as described.

40. In a bottle-cleaning machine, the combination with means adapted to clean the interior of a bottle while in a vertically-disposed position, of means adapted to releasably hold a bottle in a vertically-disposed position in operative vertical alinement with said cleaning-means, a pair of carrying-jaws adapted to carry a bottle to said supporting-means, and a pair of jaws adapted to remove said bottle from said supporting-means, each pair of said jaws comprising a casting, a pair of levers pivotally mounted on said casting, an arm pivotally mounted on the lower end of each of said levers, adjustable means adapted to maintain said arms in a horizontally-disposed position, and coöperating bottle-grasping members mounted on the inner ends of said arms; substantially as described.

41. A bottle-cleaning machine comprising a casting, a pair of coöperating-levers pivotally mounted on said casting, arms carried on the lower ends of said levers, coöperating-bottle-grasping-members carried by said arms, and means adapted to coöperate with the upper ends of said levers to actuate said levers to close said bottle-grasping-members and to allow said grasping-members to open to alternately grip and release a bottle; substantially as described.

42. A bottle-cleaning machine comprising a casting, a pair of coöperating-levers pivotally mounted on said casting, arms carried on the lower ends of said levers, coöperating bottle-grasping-members carried by said arms, means adapted to coöperate with the upper ends of said levers to actuate said levers to close said bottle-grasping-members and to allow said grasping-members to open to alternately grip and release a bottle, and springs adapted to open said grasping-members; substantially as described.

43. A bottle-cleaning machine comprising a casting, a pair of coöperating levers pivotally mounted on said casting, arms carried on the lower ends of each of said levers, coöperating bottle-grasping-members carried by said arms, a post on said casting, a member movably mounted on said post, rollers on said member adapted to coöperate with the upper ends of said levers to actuate the same, a coiled spring arranged around said post adapted to normally force said member upwardly on said post, whereby said grasping-members are normally held in closed position, means adapted to force said member downwardly on said post against the tension of said spring to allow said jaws to open, and springs adapted to open said grasping-members on the depression of said member; substantially as described.

44. A bottle-cleaning machine comprising a casting, a pair of coöperating levers pivotally mounted on said casting, arms carried on the lower ends of said levers, coöperating bottle-grasping-members carried by said arms, a post on said casting, a member provided with an enlarged bore at one end movably mounted on said post, a cam-face on the upper inner side of each of said levers, outwardly-extending-arms on said member adapted to coöperate with said cam-faces, a coiled-spring arranged around said post and interposed between the top of said casting and the top of said enlarged bore of said member, said spring being adapted to normally force said member upwardly to cause its said carried arms to actuate said levers to close said grasping-members, means adapted to alternately depress said member against the tension of said spring to allow said grasping-members to open, and springs adapted to open said grasping-members on the depression of said member; substantially as described.

45. A bottle-cleaning machine comprising a pair of coöperating-jaws adapted to releasably hold a bottle, each of said jaws comprising an arc-shaped back plate, a plurality of separate vertically-disposed bars mounted on said plate, and a facing material arranged on each of said bars; substantially as described.

46. A bottle-cleaning machine comprising a series of pairs of holding-jaws adapted to releasably hold a bottle, a reciprocatory series of pairs of carrying-jaws adapted to successively carry a bottle through said holding-jaws, and a discharge-chute adapted to receive said bottle from said carrying-jaws after the same has been carried through said holding-jaws; substantially as described.

47. A bottle-cleaning machine comprising a series of pairs of holding-jaws adapted to releasably hold a bottle, a reciprocatory series of pairs of carrying-jaws adapted to successively carry a bottle through said holding-jaws, and a discharge-chute having a yielding door adapted to receive said bottle from said carrying-jaws after the same has been carried through said holding-jaws; substantially as described.

48. A bottle-cleaning machine comprising a series of pairs of holding-jaws, each of said pairs being adapted to releasably grip a bottle, a series of pairs of carrying-jaws adapted to successively carry bottles to and remove the same from said holding-jaws, and means adapted to clean the interior of said bottles while held by said holding-jaws; substantially as described.

49. A bottle-cleaning machine comprising a series of pairs of holding-jaws, each of said pairs being adapted to releasably grip a bottle, a reciprocatory series of pairs of carrying-jaws adapted to successively carry bottles to and remove the same from said holding-jaws, and means adapted to clean the interior of said bottles while held by said holding-jaws; substantially as described.

50. A bottle-cleaning machine comprising a series of pairs of holding-jaws, each of said pairs being adapted to releasably grip a bottle, a reciprocatory series of pairs of carrying-jaws adapted to successively carry bottles to and remove the same from said holding-jaws, and brushes adapted to clean the interior of said bottles while held by said holding-jaws; substantially as described.

51. A bottle-cleaning machine comprising a series of pairs of holding-jaws, each of said pairs being adapted to releasably grip a bottle, a reciprocatory series of pairs of carrying-jaws adapted to successively carry bottles to and remove the same from said holding-jaws, and means adapted to spray the interior of said bottles with water while held in said holding-jaws; substantially as described.

52. A bottle-cleaning machine comprising a tank adapted to contain water, a set of rollers mounted in said tank adapted to rotatably support bottles and upon which said bottles are caused to travel rearwardly through said tank, a second set of rollers mounted in said tank adapted to rotatably support bottles and upon which said bottles are caused to travel forwardly in said tank, means adapted to successively receive said bottles from said first-set of rollers and transfer the same in operative position relative to said second-set of rollers, means adapted to cause said bottles to travel rearwardly on said first-set of rollers and into said transferring-means, and means adapted to successively remove said bottles from said transferring-means onto said second-set of rollers and to cause the same to travel forwardly on said second-set of rollers; substantially as described.

53. A bottle-cleaning machine comprising a tank adapted to contain water, a set of rollers mounted in said tank adapted to rotatably support bottles and upon which said bottles are caused to travel rearwardly through said tank, a second-set of rollers mounted in said tank adapted to rotatably support bottles and upon which said bottles are caused to travel forwardly in said tank, a movably mounted frame adapted to successively receive said bottles from said first-set of rollers and transfer the same in operative position relative to said second-set of rollers, means adapted to cause said bottles to travel rearwardly on said first-set of rollers and successively into said frame, means adapted to successively remove said bottles from said frame onto said second-set of rollers and to cause the same to travel forwardly on said second-set of rollers, and means adapted to clean the exterior of said bottles when on said second-se of rollers; substantially as described.

54. A bottle-cleaning machine comprising a tank adapted to contain water, a set of rollers mounted in said tank adapted to rotatably support bottles and upon which said bottles are caused to travel rearwardly through said tank, a second set of rollers mounted in said tank adapted to rotatably support bottles and upon which said bottles are caused to travel forwardly in said tank, a movably mounted frame adapted to successively receive said bottles from said first-set of rollers and transfer the same in operative position relative to said second-set of rollers, means adapted to cause said bottles to travel rearwardly on said first-set of rollers and successively into said frame, means adapted to successively remove said bottles from said frame onto said second-set of rollers and to cause the same to travel forwardly on said second-set of rollers, means adapted to rotate said sets of rollers, and a rotary brush adapted to successively clean the exterior of said bottles while on said second-set of rollers; substantially as described.

55. A bottle-cleaning machine comprising a series of pairs of holding-jaws adapted to alternately grip and release a bottle, a reciprocatory series of pairs of carrying-jaws adapted to carry a bottle successively through said series of holding-jaws, and a plurality of sets of brushes adapted to clean the interior of said bottle while the same is being successively held by said holding-jaws; substantially as described.

56. A bottle-cleaning machine comprising a series of pairs of holding-jaws adapted to alternately grip and release a bottle, a reciprocatory series of pairs of carrying-jaws adapted to carry a bottle successively through said series of holding-jaws, a plurality of sets of tubular-members adapted to be reciprocated into and out of said bottle while the same is being successively held by said holding-jaws, each set of said tubular-members communicating with a separate source of water-supply and each of said tubular-members being provided with outlet-ports and means adapted to open communication between the bores of said tubular members and the interior of said bottle when said tubular-members are within said bottle; substantially as described.

57. In a bottle-cleaning machine, means adapted to support a bottle in a horizontally-disposed position, means adapted to clean the exterior of said bottle while in said position, a pair of gripping jaws adapted to hold said bottle in vertically-disposed position, means adapted to clean the interior of said bottle while in said latter position, a pair of carrying jaws adapted to successively carry the bottles to said gripping jaws, and mechanism adapted to successively receive, transport, and elevate bottles from said horizontally-disposed supporting means to said carrying jaws and to successively invert said bottles from a horizontally-disposed position to a vertically disposed position for engagement by said carrying jaws; substantially as described.

In testimony whereof, we have signed our names to this specification in the presence of two subscribing witnesses.

CHARLES WENDE.
WILLIAM WENDE.

Witnesses:
GEORGE L. GERBER,
CAROLINE L. WEBER.